US012806843B2

(12) United States Patent
Sutter et al.

(10) Patent No.: US 12,806,843 B2

(45) Date of Patent: Nov. 24, 2026

(54) FLAME-RETARDANT CROSSLINKED ALIPHATIC POLYKETONES

(71) Applicant: Carl Freudenberg KG, Weinheim (DE)

(72) Inventors: Marco Sutter, Weinheim (DE); Bjoern Hellbach, Birkenau (DE); Kira Truxius, Darmstadt (DE)

(73) Assignee: CARL FREUDENBERG KG, Weinheim (DE)

( * ) Notice: Subject to any disclaimer, the term of this patent is extended or adjusted under 35 U.S.C. 154(b) by 630 days.

(21) Appl. No.: 18/366,011

(22) Filed: Aug. 7, 2023

(65) Prior Publication Data

US 2024/0066778 A1 Feb. 29, 2024

(30) Foreign Application Priority Data

Aug. 12, 2022 (EP) ..................................... 22190115

(51) Int. Cl.

| | |
|---|---|
| ***B29C 48/00*** | (2019.01) |
| ***B29C 48/40*** | (2019.01) |
| ***B29K 73/00*** | (2006.01) |
| ***C08G 67/02*** | (2006.01) |
| ***C08K 3/016*** | (2018.01) |
| ***C08K 3/22*** | (2006.01) |
| ***C08K 3/32*** | (2006.01) |
| ***C08K 5/00*** | (2006.01) |
| ***C08K 5/17*** | (2006.01) |
| ***C08K 5/18*** | (2006.01) |
| ***C08K 7/14*** | (2006.01) |
| ***C08L 73/00*** | (2006.01) |

(52) U.S. Cl.

CPC ............ *B29C 48/022* (2019.02); *C08K 3/016* (2018.01); *C08K 3/22* (2013.01); *C08K 3/32* (2013.01); *C08K 5/0025* (2013.01); *C08K 5/17* (2013.01); *C08K 5/18* (2013.01); *C08L 73/00* (2013.01); *B29C 48/40* (2019.02); *B29C 2948/92704* (2019.02); *B29K 2073/00* (2013.01); *C08G 67/02* (2013.01); *C08K 2003/2224* (2013.01); *C08K 5/0066* (2013.01); *C08K 7/14* (2013.01); *C08L 2201/02* (2013.01); *C08L 2203/30* (2013.01); *C08L 2312/00* (2013.01)

(58) Field of Classification Search

CPC ........ B29C 48/022; B29C 2948/92704; B29C 48/40; B29K 2073/00; C08G 67/02; C08K 5/18; C08K 3/016; C08K 3/22; C08K 3/0025; C08K 3/32; C08K 5/17; C08K 5/0066; C08K 7/14; C08K 2003/2224; C08L 2201/02; C08L 2203/30; C08L 2312/00

See application file for complete search history.

(56) References Cited

U.S. PATENT DOCUMENTS

| | | | |
|---|---|---|---|
| 2017/0137608 A1 | 5/2017 | Stoeppelmann et al. | |
| 2020/0080236 A1* | 3/2020 | Fischer ..................... | D01F 8/04 |
| 2021/0309784 A1 | 10/2021 | Schauber et al. | |
| 2023/0081308 A1 | 3/2023 | Schauber et al. | |

FOREIGN PATENT DOCUMENTS

| | | |
|---|---|---|
| KR | 20160059905 A | 5/2016 |
| KR | 1020160059873 A | 5/2016 |
| KR | 101684885 B1 | 12/2016 |
| KR | 20200038373 A | 4/2020 |
| WO | WO 97/14743 A1 | 4/1997 |
| WO | WO 2020/030599 A1 | 2/2020 |
| WO | WO 2021156403 A1 | 8/2021 |

OTHER PUBLICATIONS

Machine English translation of WO 2021/156403 Schauber et al., Aug. 12, 2021.*

* cited by examiner

*Primary Examiner* — Patrick D Niland

(74) *Attorney, Agent, or Firm* — LEYDIG, VOIT & MAYER, LTD.

(57) ABSTRACT

A molded article includes a polymer matrix of crosslinking an aliphatic polyketone with at least one diamine source as a crosslinking agent to form imine groups. The diamine source is selected from the group consisting of di(aminophenyl) compounds in which the two aminophenyl rings are linked to each other through an aliphatic group having a carbocyclic residue, diamine compounds, saturated alicyclic compounds having at least two primary amine groups, and oligo-/polymers containing these incorporated, and mixtures thereof. The molded article further includes at least one flame retardant.

20 Claims, 2 Drawing Sheets

FIG. 1: Rheometer curve of a PK/PA-
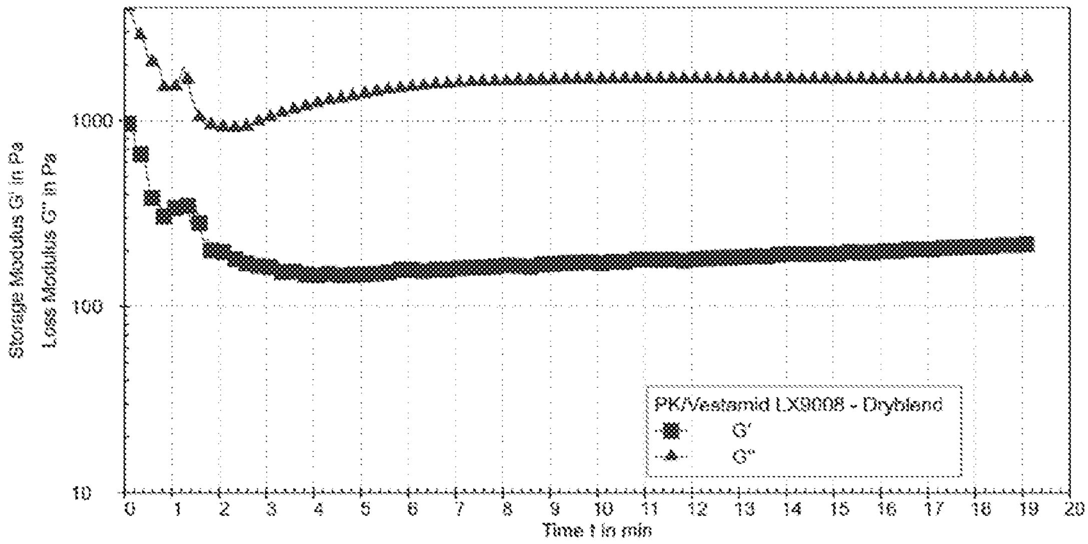
FIG. 2: Rheometer curve of a PK/aromatic crosslinker dryblend
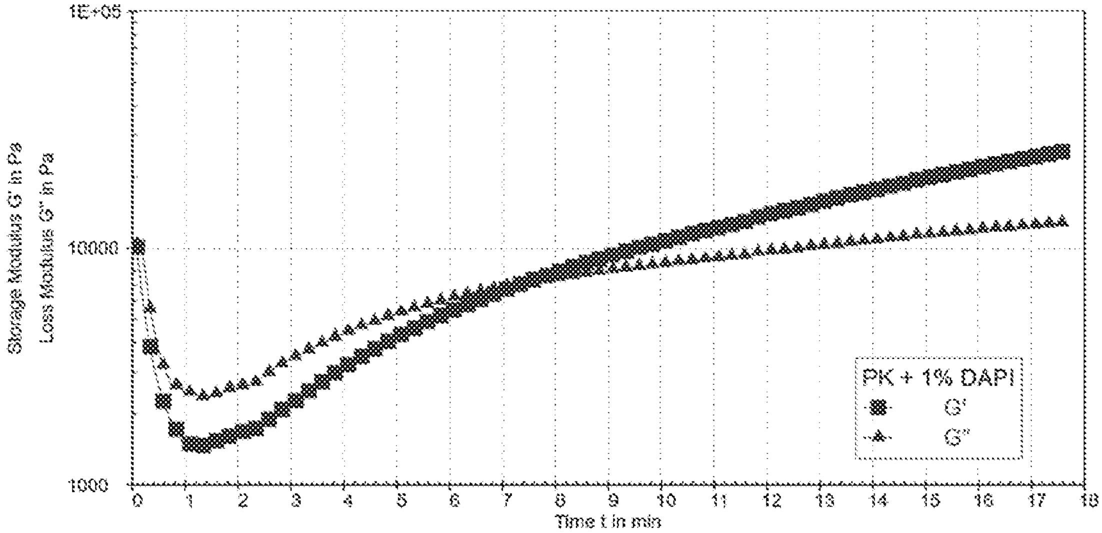

FIG. 3: Rheometer curve of a PK/aliphatic crosslinker dryblend
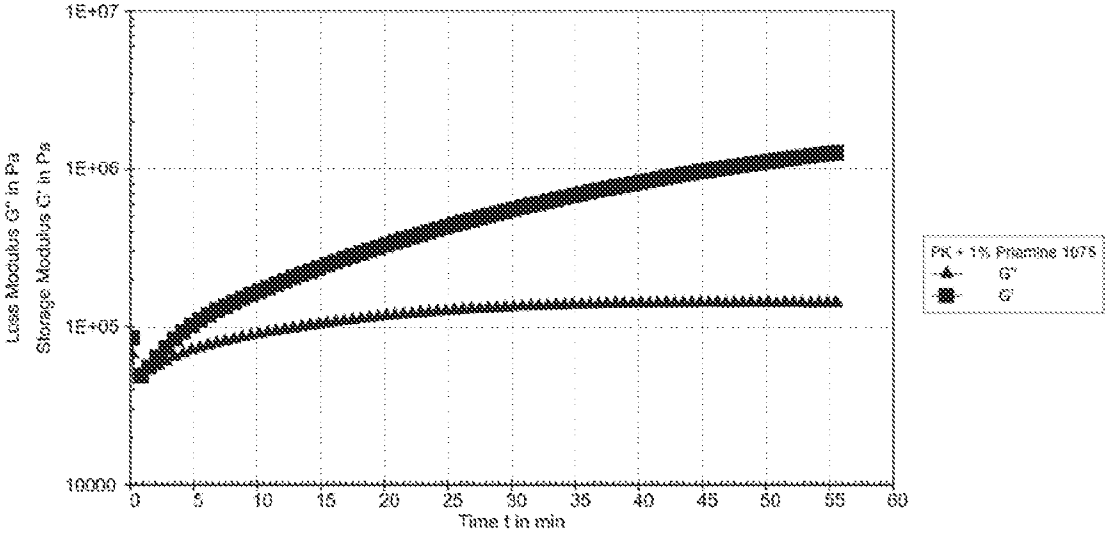

FLAME-RETARDANT CROSSLINKED ALIPHATIC POLYKETONES

CROSS REFERENCE TO RELATED APPLICATIONS

This application claims benefit to European Patent Application No. EP 22 190 115.0, filed on Aug. 12, 2022, which is hereby incorporated by reference herein.

FIELD

The present invention relates to a molded article comprising a polymer matrix containing a crosslinked aliphatic polyketone (PK) in combination with flame retardants, and to a process for producing such a molded article. In addition, the invention relates to the use of the molded article in a wide range of industrial areas, preferably selected from automotive industry, marine industry, aerospace industry, rail industry, industrial machines and robotics, service robots, oil and gas industry, electronic industry, energy generation, transmission and distribution, computer industry, office machines, radio and TV sets, food and beverage industry, safety technology, packaging industry and medical (healthcare) industry.

conditions of some fire tests because, although they do not burn due to their flame-retardant equipment, they can certainly soften and melt, causing the components to lose their function. This problem could be solved if it were possible to develop a thermoplastic flame-retardant material that exhibits its thermoset behavior after processing.

Aliphatic polyketones (PK) are thermoplastics with good mechanical properties, especially high impact strength, and good media resistance. They have an alternating structure in which an ethylene or propylene group is followed by a keto group (carbonyl group), with the proportions of propylene groups usually being small and variable. Aliphatic polyketones are characterized in particular by very good resilience, high impact strength values even at low temperatures, high mechanical fatigue strength, a low tendency to creep deformation and good sliding and wear behavior.

Aliphatic polyketones are linearly structured polymers produced from carbon monoxide and α-olefins, with the arrangement of the monomeric units in the polymeric chain strictly alternating. Nowadays, polyketone terpolymers are used almost exclusively instead of the classical polyketone copolymers, which are made only from carbon monoxide and ethylene. These polyketone terpolymers consist of carbon monoxide, ethylene and preferably small amounts of propylene.

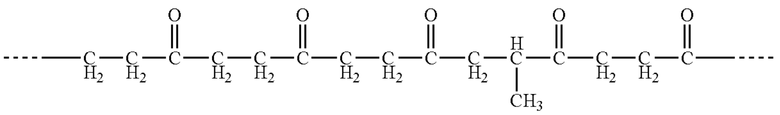

BACKGROUND

Thermoplastically processable plastics (thermoplastics) have become widely used due to the productivity of their production, their reversible formability and often also due to their high-quality technical properties, and are now a standard product in industrial production. They consist of essentially linear polymer chains, i.e. they are uncrosslinked and usually also have little or no branching. However, thermoplastics have an intrinsic limit with regard to their temperature resistance and are therefore not ideally suited for all applications of polymeric materials. It is therefore desirable to increase the temperature resistance of thermoplastic plastics without sacrificing advantages such as processability, good mechanical properties or high chemical resistance. In terms of temperature resistance, crosslinked polymers (thermosets) in which the macromolecules are linked by covalent bonds are often advantageous. At low temperatures, these are in the hard-elastic state, also known as the glass transition region. If thermosets are heated beyond this range, they generally enter directly into the thermal decomposition range. There is therefore a great interest in developing new materials that combine the advantages of both thermoplastics and thermosets, i.e., the materials can be formed cost-effectively and exhibit high heat resistance after molding. This combination would be particularly advantageous for plastics used in electromobility. Since the lithium-ion batteries often used at present have a higher risk of so-called thermal runaway events, vehicle and battery manufacturers are forced to use only flame-retardant plastics in the installation space around the battery. During thermal testing of the components, however, it regularly becomes apparent that flame-retardant thermoplastics cannot withstand the harsh The reason for using terpolymers instead of copolymers is the significantly reduced brittleness of terpolymers. Due to their strictly alternating polymer chain with an extremely low defect rate (one defect per one million monomeric units) as well as the high number of polar keto groups, polyketone copolymers, consisting of carbon monoxide and ethylene, are highly crystalline, very hard but also very brittle, which significantly limits their application possibilities as polymeric materials. By adding small amounts of propylene (about 5%) during synthesis, it has been possible to disrupt the crystallinity in such a way that the melting point is lowered from 255 °C (copolymer of carbon monoxide and ethylene) to 220 °C (terpolymer) and an extremely tough polymer is obtained instead of a brittle one. Aliphatic polyketones are characterized, among other things, by high impact strength, low creep, high chemical resistance and good tribological properties. However, the PK also exhibit the intrinsically given limit with regard to temperature resistance that is typical of thermoplastics, as mentioned above. Thus, the use of PK for the maximum continuous service temperature of about 80 °C to 100 °C (heat deflection temperature HDT/A according to ISO 75) is disadvantageous. Thus, the application possibilities of this polymer class are significantly limited.

WO97/14743 relates to a non-crosslinked polyketone which is blended with a mixture of a reinforcement and a flame retardant.

In order to further increase the temperature resistance and mechanical stability of the PK, it was proposed to crosslink the polymer chains.

Processes for chemical crosslinking of polyetheretherketones (PEEK) with diamines have been known since the 1980s.

The crosslinking reaction of PK with an amine can be described as follows: the keto groups of the aliphatic polyketones are reacted with amines to form Schiff bases. However, since aliphatic polyketones tend to tautomerize their keto groups into the corresponding enol forms at elevated temperatures and then to uncontrolled follow-up-reactions of, these reactions usually compete with the crosslinking, which makes controlled crosslinking of the materials much more difficult.

Furthermore, the handling of volatile diamines at high temperatures is associated with significant hazards to the user and a high environmental impact. Therefore, it would be desirable to design the above-described process and the reagents used therein in such a way that no hazards for the users and the environment occurs.

In recent publications attempts are described that were made to remedy this drawback.

WO2020/030599 A2 describes a process for the preparation of a PAEK-containing crosslinked molded article, wherein the crosslinker is a di(aminophenyl) compound in which the two aminophenyl rings are linked to each other via an aliphatic group having a carbocyclic residue. Specifically, 1-(4-aminophenyl)-1,3,3-trimethylindan-5-amine (=DAPI, CAS No. 54628-89-6), the isomer mixture of DAPI with 1-(4-aminophenyl)-1,3,3-trimethylindan-6-amine or the isomer mixture with the CAS No. 68170-20-7 are used as the crosslinker component. One disadvantage is the high production costs of the crosslinker. On the other hand, the physicochemical properties of the PAEK crosslinked with DAPI also need improvement.

WO2021156403 A1 describes a molded article comprising a polymer matrix containing a crosslinked aliphatic polyketone (PK), wherein the crosslinking agents are selected from various diamino compounds, oligo/polymeres comprising amid groups and saturated, alicyclic amino compounds.

However, none of the prior art documents proposes a flameproof equipment of the PK polymer.

KR20200038373 relates to a polyketone composition with flame retardancy and heat resistance which contains: 60.0 to 85.0 wt % of polyketone consisting of carbon monoxide and at least one olefin-based unsaturated hydrocarbon; 0.1 to 23.0 wt % of polyamide; 0.1 to 5.0 wt % of rubber; 8.0 to 12.0 wt % of a phosphorus-based flame retardant; 0.05 to 0.6 wt % of copper oxide; and 0.1 to 1.0 wt % of silicon oil.

KR20160059905 relates to polyketone composition, comprising polyketone phosphorus-based flame retardant and nylon 61, for end housing of a laptop, produced by injection-molding.

In both documents the polyketone composition is based on the blending of polyketone with a polyamide. Indeed, in these blends a crosslinking of polyketone and polyamide is principally possible. However, the post-curing time is very long, so it has no relevance in practice.

Therefore, it would be highly desirable to obtain crosslinked aliphatic polyketones that would be characterized by improved mechanical properties as well as improved heat resistance, reduced creep, and increased chemical resistance, while exhibiting low flammability or flame retardant properties.

SUMMARY

In an embodiment, the present disclosure provides a molded article comprising a polymer matrix of crosslinking an aliphatic polyketone with at least one diamine source as a crosslinking agent to form imine groups. The diamine source is selected from the group consisting of di(aminophenyl) compounds in which the two aminophenyl rings are linked to each other through an aliphatic group having a carbocyclic residue, diamine compounds, saturated alicyclic compounds having at least two primary amine groups, and oligo-/polymers containing these incorporated, and mixtures thereof. The diamine compounds are selected from compounds of formula (I), (II) and (III), (I)

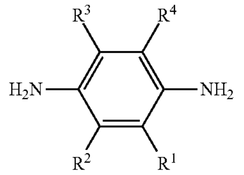

(II)

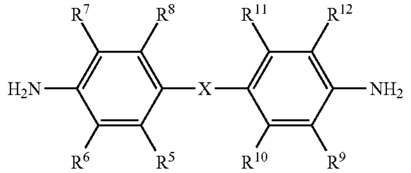

(III)

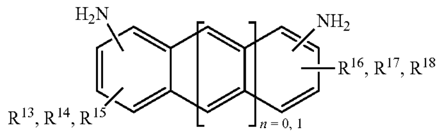

wherein $R^1$, $R^2$, $R^3$ and $R^4$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, and $C_6$-$C_{14}$ aryl, wherein the alkyl group, alkenyl group and alkynyl group are unsubstituted or substituted with $R^a$ and wherein the aryl group is unsubstituted or substituted with $R^b$. $R^5$, $R^6$, $R^7$ $R^8$, $R^9$, $R^{10}$, $R^{11}$ and $R^{12}$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, and $C_6$-$C_{14}$ aryl, wherein the alkyl group, alkenyl group and alkynyl group are unsubstituted or substituted with $R^a$ and wherein the aryl group is unsubstituted or substituted with $R^b$. $R^{13}$, $R^{14}$, $R^{15}$, $R^{16}$, $R^{17}$ and $R^{18}$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, and $C_6$-$C_{14}$ aryl, wherein the alkyl group, alkenyl group and alkynyl group are unsubstituted or substituted with $R^a$ and wherein the aryl group is unsubstituted or substituted with $R^b$. X is selected from a bond, oxygen, sulfur, carbonyl, sulfonyl, sulfoxide, $C_1$-$C_6$ alkylene, $C_2$-$C_6$ alkenylene and phenylene. $R^a$ is selected from halogen, nitro, cyano, hydroxy, carboxyl, amino, and $C_6$-$C_{12}$ aryl, wherein the aryl group is unsubstituted or substituted with $R^c$. $R^b$ is selected from halogen, nitro, cyano, amino, $C_1$-$C_4$ alkyl and $C_1$-$C_4$ haloalkyl. $R^c$ is selected from halogen, nitro, cyano, $C_1$-$C_4$ alkyl and $C_1$-$C_4$ haloalkyl. The molded article further comprises at least one flame retardant (A).

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 illustrates a rheometer curve of a PK/PA-dryblend;

FIG. 2 illustrates a rheometer curve of a PK/aromatic crosslinker dryblend; and FIG. 3 illustrates a rheometer curve of a PK/aliphatic crosslinker dryblend.

DETAILED DESCRIPTION

In an embodiment, the present invention provides an optimized flame resistant equipped PK, wherein the aforementioned properties are improved or at least not impaired.

Surprisingly, the problem underlying an embodiment of the invention is solved by methods, molded articles and sealing articles, wherein a polyketone is subjected to a crosslinking with a special diamine source to form imine groups in the presence of a flame retardant. In this process, a plasticized mixture of at least one polyketone, at least one flame retardant and at least one diamine source can first be subjected to a molding process to produce a molded article. Subsequently, the molded article can be subjected to crosslinking. Preferably, depending on the selected crosslinking chemistry the molded article is crosslinked during the molding step or subsequently crosslinked in a post-curing step.

The molded article according to an embodiment of the invention as well as the process according to an embodiment of the invention have the following advantages:

- The crosslinked polyketones used according to embodiments of the invention and the molded articles according to embodiments of the invention are flame-resistant.
- The crosslinked, flame-retardant polyketones used according to embodiments of the invention and the molded articles according to embodiments of the invention have improved temperature resistance, lower flammability, and higher stiffness (modulus) at high temperatures.
- The crosslinked, flame-retardant polyketones used according to embodiments of the invention and the molded articles according to embodiments of the invention have improved stability and are still well processable.
- The crosslinked, flame-retardant polyketones used according to embodiments of the invention and the molded articles according to embodiments of the invention are characterized by increased flame resistance and increased dimensional stability under direct flame impingement. In other word, in case of fire, these materials remain dimensionally stable and do not burn.
- The process according to embodiments of the invention are characterized by low costs. The diamine sources used according to embodiments of the invention are commercially available base materials with generally low procurement costs.
- The polyamides can serve as a source of low molecular weight polyamides and diamines. Depending on the reaction conditions, it can be controlled which crosslinker component is formed from the polyamides. By using polyamides as a source of diamines, it is thus also possible to crosslink PKs with low-boiling aliphatic diamines, which otherwise cannot be implemented for process engineering/safety/environmental reasons.
- The process according to embodiments of the invention are technically simple to carry out, since only two components (preferably two granules) have to be conveyed and mixed.
- The moldings according to embodiments of the invention have good tribological properties, in particular a very good abrasion behavior. They are suitable for materials for use under abrasive wear conditions, e.g., as seals and sliding bearing materials in conveying equipment for aggressive and abrasive media.
- The molded article according to embodiments of the invention show lower swelling.
- Due to the long-established components used, a REACH approval for the polymers is not necessary.
- The process according to embodiments of the invention are sustainable. The non-crosslinked residual materials can be easily recycled and do not have to be disposed of. Potentially harmful substances for the environment and health, such as volatile aromatic amines, are avoided in the process according to embodiments of the invention.
- The hardenable polymer composition, as well as the cross-linked molded article according to embodiments of the invention have good resistance to chemicals and exhibit a low tendency to creep.

In an embodiment, the present invention relates to a molded article comprising:

a) a polymer matrix of crosslinking an aliphatic polyketone with at least one diamine source as a crosslinking agent to form imine groups and wherein the diamine source is selected from the group consisting of
   - di(aminophenyl) compounds in which the two aminophenyl rings are linked to each other through an aliphatic group having a carbocyclic residue,
   - diamine compounds selected from compounds of formula (I), (II) and (III), (I)

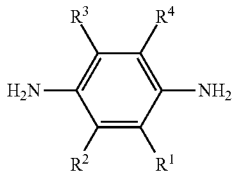

(II)

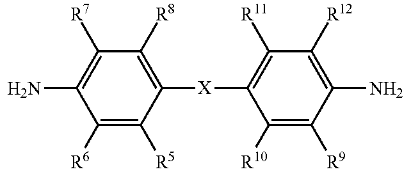

(III)

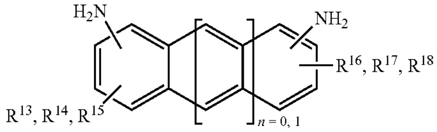

wherein $R^1$, $R^2$, $R^3$ and $R^4$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, $C_6$-$C_{14}$ aryl, wherein the alkyl group, alkenyl group and alkynyl group are unsubstituted or substituted with $R^a$ and wherein the aryl group is unsubstituted or substituted with $R^b$, $R^5$, $R^6$, $R^7$ $R^8$, $R^9$, $R^{10}$, $R^{11}$ and $R^{12}$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, $C_6$-$C_{14}$ aryl, wherein the alkyl group, alkenyl group and alkynyl group are unsubstituted or substituted with $R^a$ and wherein the aryl group is unsubstituted or substituted with $R^b$, $R^{13}$, $R^{14}$, $R^{15}$, $R^{16}$, $R^{17}$ and $R^{18}$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, $C_6$-$C_{14}$ aryl, wherein the alkyl group, alkenyl group and alkynyl group are unsubstituted or substituted with $R^a$ and wherein the aryl group is unsubstituted or substituted with $R^b$, X is selected from a bond, oxygen, sulfur, carbonyl, sulfonyl, sulfoxide, $C_1$-$C_6$ alkylene, $C_2$-$C_6$ alkenylene and phenylene, $R^a$ is selected from halogen, nitro, cyano, hydroxy, carboxyl, amino, $C_6$-$C_{12}$ aryl, wherein the aryl group is unsubstituted or substituted with $R^c$, $R^b$ is selected from halogen, nitro, cyano, amino, $C_1$-$C_4$ alkyl and $C_1$-$C_4$ haloalkyl, $R^c$ is selected from halogen, nitro, cyano, $C_1$-$C_4$ alkyl and $C_1$-$C_4$ haloalkyl, oligo-/polymers containing at least two amide groups, saturated alicyclic compounds having at least two primary amine groups, and oligo-/polymers containing these incorporated and mixtures thereof;

b) a flame retardant (A).

In an embodiment, the invention in particular relates to a molded article comprising:

b) a polymer matrix of crosslinking an aliphatic polyketone with at least one diamine source as a crosslinking agent to form imine groups and wherein the diamine source is selected from the group consisting of di(aminophenyl) compounds in which the two aminophenyl rings are linked to each other through an aliphatic group having a carbocyclic residue, diamine compounds selected from compounds of formula (I), (II) and (III), (I)

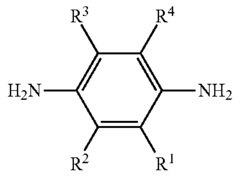

(II)

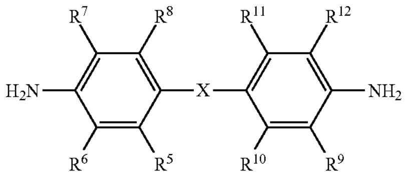

(III)

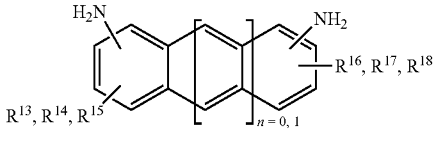

wherein $R^1$, $R^2$, $R^3$ and $R^4$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, $C_6$-$C_{14}$ aryl, wherein the alkyl group, alkenyl group and alkynyl group are unsubstituted or substituted with $R^a$ and wherein the aryl group is unsubstituted or substituted with $R^b$, $R^5$, $R^6$, $R^7$ $R^8$, $R^9$, $R^{10}$, $R^{11}$ and $R^{12}$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, $C_6$-$C_{14}$ aryl, wherein the alkyl group, alkenyl group and alkynyl group are unsubstituted or substituted with $R^a$ and wherein the aryl group is unsubstituted or substituted with $R^b$, $R^{13}$, $R^{14}$, $R^{15}$, $R^{16}$, $R^{17}$ and $R^{18}$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, $C_6$-$C_{14}$ aryl, wherein the alkyl group, alkenyl group and alkynyl group are unsubstituted or substituted with $R^a$ and wherein the aryl group is unsubstituted or substituted with $R^b$, X is selected from a bond, oxygen, sulfur, carbonyl, sulfonyl, sulfoxide, $C_1$-$C_6$ alkylene, $C_2$-$C_6$ alkenylene and phenylene, $R^a$ is selected from halogen, nitro, cyano, hydroxy, carboxyl, amino, $C_6$-$C_{12}$ aryl, wherein the aryl group is unsubstituted or substituted with $R^c$, $R^b$ is selected from halogen, nitro, cyano, amino, $C_1$-$C_4$ alkyl and $C_1$-$C_4$ haloalkyl, $R^c$ is selected from halogen, nitro, cyano, $C_1$-$C_4$ alkyl and $C_1$-$C_4$ haloalkyl, saturated alicyclic compounds having at least two primary amine groups, and oligo-/polymers containing these incorporated and mixtures thereof;

b) a flame retardant (A).

In an embodiment, the invention also relates to a process for the preparation of a molded article, comprising the steps of:

i) providing a mixture comprising at least one aliphatic polyketone, at least one crosslinker and at least one flame retardant as defined above and below, ii) preparing a molded article from the mixture obtained in step i), and iii) thermally treating the molded article at a temperature at which the aliphatic polyketone is crosslinked, and wherein the crosslinker is selected from di(aminophenyl) compounds in which the two aminophenyl rings are linked to each other through an aliphatic group having a carbocyclic residue, diamine compounds selected from compounds of formula (I), (II) and (III), (I)

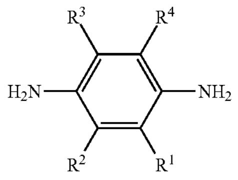

-continued (II)

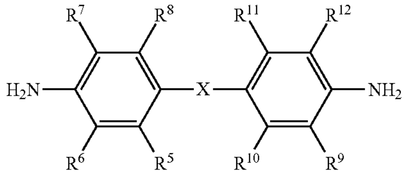

(III)

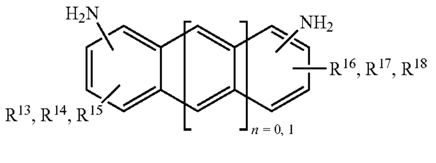

wherein $R^1$, $R^2$, $R^3$ and $R^4$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, $C_6$-$C_{14}$ aryl, wherein the alkyl group, alkenyl group and alkynyl group are unsubstituted or substituted with $R^a$ and wherein the aryl group is unsubstituted or substituted with $R^b$, $R^5$, $R^6$, $R^7$ $R^8$, $R^9$, $R^{10}$, $R^{11}$ and $R^{12}$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, $C_6$-$C_{14}$ aryl, wherein the alkyl group, alkenyl group and alkynyl group are unsubstituted or substituted with $R^a$ and wherein the aryl group is unsubstituted or substituted with $R^b$, $R^{13}$, $R^{14}$, $R^{15}$, $R^{16}$, $R^{17}$ and $R^{18}$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, $C_6$-$C_{14}$ aryl, wherein the alkyl group, alkenyl group and alkynyl group are unsubstituted or substituted with $R^a$ and wherein the aryl group is unsubstituted or substituted with $R^b$, X is selected from a bond, oxygen, sulfur, carbonyl, sulfonyl, sulfoxide, $C_1$-$C_6$ alkylene, $C_2$-$C_6$ alkenylene and phenylene, $R^a$ is selected from halogen, nitro, cyano, hydroxy, carboxyl, amino, $C_6$-$C_{12}$ aryl, wherein the aryl group is unsubstituted or substituted with $R^c$, $R^b$ is selected from halogen, nitro, cyano, amino, $C_1$-$C_4$ alkyl and $C_1$-$C_4$ haloalkyl, $R^c$ is selected from halogen, nitro, cyano, $C_1$-$C_4$ alkyl and $C_1$-$C_4$ haloalkyl, oligo-/polymers containing at least two amide groups, saturated alicyclic compounds having at least two primary amine groups, and oligo-/polymers containing these incorporated and mixtures thereof.

In an embodiment, the invention also in particular relates to a process for the preparation of a molded article, comprising the steps of:

i) providing a mixture comprising at least one aliphatic polyketone, at least one crosslinker and at least one flame retardant as defined above and below, ii) preparing a molded article from the mixture obtained in step i), and/or iii) thermally treating the molded article at a temperature at which the aliphatic polyketone is crosslinked, and wherein the crosslinker is selected from di(aminophenyl) compounds in which the two aminophenyl rings are linked to each other through an aliphatic group having a carbocyclic residue, diamine compounds selected from compounds of formula (I), (II) and (III), (I)

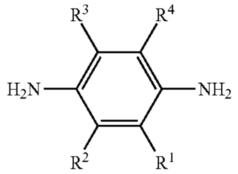

(II)

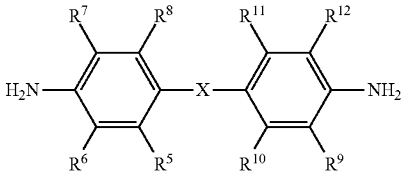

(III)

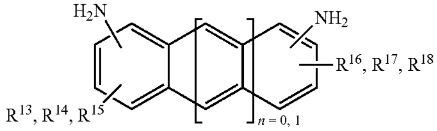

wherein $R^1$, $R^2$, $R^3$ and $R^4$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, $C_6$-$C_{14}$ aryl, wherein the alkyl group, alkenyl group and alkynyl group are unsubstituted or substituted with $R^a$ and wherein the aryl group is unsubstituted or substituted with $R^b$, $R^5$, $R^6$, $R^7$ $R^8$, $R^9$, $R^{10}$, $R^{11}$ and $R^{12}$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, $C_6$-$C_{14}$ aryl, wherein the alkyl group, alkenyl group and alkynyl group are unsubstituted or substituted with $R^a$ and wherein the aryl group is unsubstituted or substituted with $R^b$, $R^{13}$, $R^{14}$, $R^{15}$, $R^{16}$, $R^{17}$ and $R^{18}$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, $C_6$-$C_{14}$ aryl, wherein the alkyl group, alkenyl group and alkynyl group are unsubstituted or substituted with $R^a$ and wherein the aryl group is unsubstituted or substituted with $R^b$, X is selected from a bond, oxygen, sulfur, carbonyl, sulfonyl, sulfoxide, $C_1$-$C_6$ alkylene, $C_2$-$C_6$ alkenylene and phenylene, $R^a$ is selected from halogen, nitro, cyano, hydroxy, carboxyl, amino, $C_6$-$C_{12}$ aryl, wherein the aryl group is unsubstituted or substituted with $R^c$, $R^b$ is selected from halogen, nitro, cyano, amino, $C_1$-$C_4$ alkyl and $C_1$-$C_4$ haloalkyl, $R^c$ is selected from halogen, nitro, cyano, $C_1$-$C_4$ alkyl and $C_1$-$C_4$ haloalkyl, saturated alicyclic compounds having at least two primary amine groups, and oligo-/polymers containing these incorporated and mixtures thereof.

In an embodiment, the invention further relates to a hardenable polymer composition comprising at least one polyketone, at least one flame retardant and at least one crosslinker selected from the group consisting of:

di(aminophenyl) compounds in which the two aminophenyl rings are linked to each other through an aliphatic group having a carbocyclic residue, diamine compounds selected from compounds of formula (I), (II) and (III), (I)

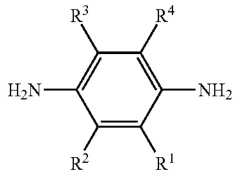

(II)

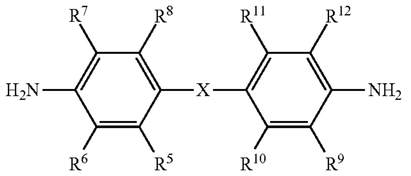

(III)

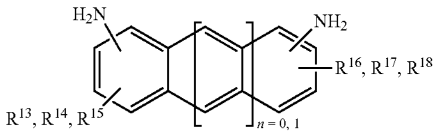

wherein $R^1$, $R^2$, $R^3$ and $R^4$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, $C_6$-$C_{14}$ aryl, wherein the alkyl group, alkenyl group and alkynyl group are unsubstituted or substituted with $R^a$ and wherein the aryl group is unsubstituted or substituted with $R^b$, $R^5$, $R^6$, $R^7$ $R^8$, $R^9$, $R^{10}$, $R^{11}$ and $R^{12}$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, $C_6$-$C_{14}$ aryl, wherein the alkyl group, alkenyl group and alkynyl group are unsubstituted or substituted with $R^a$ and wherein the aryl group is unsubstituted or substituted with $R^b$, $R^{13}$, $R^{14}$, $R^{15}$, $R^{16}$, $R^{17}$ and $R^{18}$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, $C_6$-$C_{14}$ aryl, wherein the alkyl group, alkenyl group and alkynyl group are unsubstituted or substituted with $R^a$ and wherein the aryl group is unsubstituted or substituted with $R^b$, X is selected from a bond, oxygen, sulfur, carbonyl, sulfonyl, sulfoxide, $C_1$-$C_6$ alkylene, $C_2$-$C_6$ alkenylene and phenylene, $R^a$ is selected from halogen, nitro, cyano, hydroxy, carboxyl, amino, $C_6$-$C_{12}$ aryl, wherein the aryl group is unsubstituted or substituted with $R^c$, $R^b$ is selected from halogen, nitro, cyano, amino, $C_1$-$C_4$ alkyl and $C_1$-$C_4$ haloalkyl, $R^c$ is selected from halogen, nitro, cyano, $C_1$-$C_4$ alkyl and $C_1$-$C_4$ haloalkyl, oligo-/polymers containing at least two amide groups, saturated alicyclic compounds having at least two primary amine groups, and oligo-/polymers containing these incorporated and mixtures thereof.

In an embodiment, the invention further in particular relates to a hardenable polymer composition comprising at least one polyketone, at least one flame retardant and at least one crosslinker selected from the group consisting of:

di(aminophenyl) compounds in which the two aminophenyl rings are linked to each other through an aliphatic group having a carbocyclic residue, diamine compounds selected from compounds of formula (I), (II) and (III), (I)

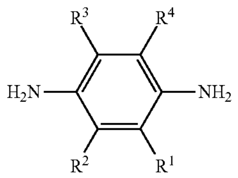

(II)

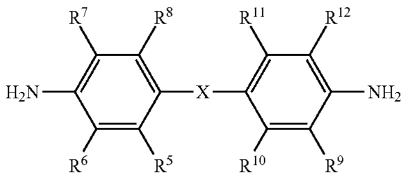

(III)

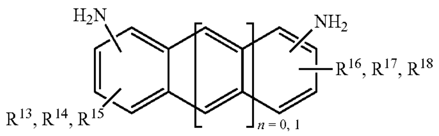

wherein $R^1$, $R^2$, $R^3$ and $R^4$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, $C_6$-$C_{14}$ aryl, wherein the alkyl group, alkenyl group and alkynyl group are unsubstituted or substituted with $R^a$ and wherein the aryl group is unsubstituted or substituted with $R^b$, $R^5$, $R^6$, $R^7$ $R^8$, $R^9$, $R^{10}$, $R^{11}$ and $R^{12}$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, $C_6$-$C_{14}$ aryl, wherein the alkyl group, alkenyl group and alkynyl group are unsubstituted or substituted with $R^a$ and wherein the aryl group is unsubstituted or substituted with $R^b$, $R^{13}$, $R^{14}$, $R^{15}$, $R^{16}$, $R^{17}$ and $R^{18}$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, $C_6$-$C_{14}$ aryl, wherein the alkyl group, alkenyl group and alkynyl group are unsubstituted or substituted with $R^a$ and wherein the aryl group is unsubstituted or substituted with $R^b$, X is selected from a bond, oxygen, sulfur, carbonyl, sulfonyl, sulfoxide, $C_1$-$C_6$ alkylene, $C_2$-$C_6$ alkenylene and phenylene, $R^a$ is selected from halogen, nitro, cyano, hydroxy, carboxyl, amino, $C_6$-$C_{12}$ aryl, wherein the aryl group is unsubstituted or substituted with $R^c$, $R^b$ is selected from halogen, nitro, cyano, amino, $C_1$-$C_4$ alkyl and $C_1$-$C_4$ haloalkyl, $R^c$ is selected from halogen, nitro, cyano, $C_1$-$C_4$ alkyl and $C_1$-$C_4$ haloalkyl, saturated alicyclic compounds having at least two primary amine groups, and oligo-/polymers containing these incorporated and mixtures thereof.

In an embodiment, the invention further relates to a use of a molded article as defined above and below in the automotive industry, marine industry aerospace industry, rail industry, industrial machines and robotics, service robots, oil and gas industry, electronic industry, computer industry, office machines, radio and TV sets, food and beverage industry, safety technology, packaging industry and medical (healthcare) industry.

In an embodiment, the invention further relates to sealing articles, thrust washers, back-up rings, valves, connectors, insulators, snap hooks, bearings, bushings, films, powders, coatings, fibers, sealing and O-rings, pipes and wires, cooling tubes, cables, sheaths, sleeves and jackets, housings of an electrical or chemical application, battery housing consisting of or containing a molded article as defined above and below.

In an embodiment, the invention further relates to a use of a flame retardant (A) as defined above and below for providing a flame-resistant molded article as defined above and below or a flame-resistant polymer composition as defined above and below.

DETAILED DESCRIPTION

In the following, the terms "crosslinker" and "diamine source" are used synonymously.

In the following, also the terms curable polymer composition and hardenable polymer composition are used synonymously.

In the sense of the application the term "blend" denotes a composition the mandatory comprises two or more polymer components.

In the sense of the application the term "compounding" denotes the formation of a mixture of a polymer component and at least one additive. The polymer component may be a single polymer or a polymer blend or a component that comprises at least one additive.

Polyketone

In principle, any aliphatic polyketones can be used as polymer components. According to an embodiment of the invention, aliphatic polyketones (PK) are linearly structured polymers prepared from carbon monoxide and α-olefins, with the arrangement of the monomeric units in the polymeric chain being, preferably strictly, alternating. The aliphatic polyketone differs from polyaryl ether ketones (PAEK), such as polyether ether ketones (PEEK) in that it does not contain aromatic rings and ether groups. Preferred PAEs according to an embodiment of the invention are polyketone terpolymers. These polyketone terpolymers consist of carbon monoxide, ethylene and preferably small amounts of propylene.

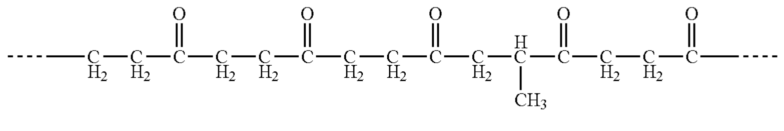

According to an embodiment of the invention, the aliphatic polyketones have linear polymer chains consisting of alternating alkylene units and keto groups. The alkylene units preferably comprise ethylene units as the main component, particularly preferably ethylene units as the main component combined with 1-methylethylene units. The aliphatic polyketones may differ in their average molecular weight as well as in the ratio of the reactants carbon monoxide, ethylene as well as another alkene, for example propylene or 1- or 2-butylene, used for the preparation. The aliphatic polyketones have keto groups which can be linked to form imine bonds. According to an embodiment of the invention, mixtures of different aliphatic polyketones that differ, for example, in their molecular weight or composition can also be used. However, it is preferred to use a single PK, because this allows higher crystallinity and associated temperature stability to be achieved.

In a preferred embodiment, the aliphatic polyketone has an average mean molecular weight $M_n$ (number average) in the range from 60000 g/mol to 100000 g/mol or an average mean molecular weight $M_w$ (mass average) in the range from 132000 g/mol to 320000 g/mol (determined by GPC measurements). The polydispersity of the aliphatic polyketones is preferably between 2.2 and 3.2. The aliphatic polyketones further preferably have a glass transition point of 10 to 14 °C, a melting point of 218 to 226 °C and/or a recrystallization temperature of 170 to 182 °C (determined by DSC, DIN EN ISO 11357-1 to 3, 20 °C/min heating rate). It was found that crosslinked PK according to an embodiment of the invention exhibits particularly advantageous properties, especially improved mechanical and chemical properties.

Preferably, the aliphatic polyketone (PK) has a melt flow index (MFR) at 240 °C in the range from 2 $cm^3$/10 min to 200 $cm^3$/10 min, in particular from 6 $cm^3$/10 min to 60 $cm^3$/10 min. The measurement is carried out in accordance with DIN ISO 1133, with the material being melted at 240 °C and loaded with a 2.16 kg die, after which the flowability is determined. An example of particularly suitable aliphatic polyketone is M330A from Hyosung. The melt flow index generally correlates with the molecular weight of the polymer chains. It has been found that such a melt flow index is advantageous because, according to an embodiment of the invention, both good thermoplastic processability and miscibility can be achieved, and a homogeneous product with high stability, and in particular high stiffness, can be obtained.

Suitable PKs are commercially available e.g. M230A (MFR=150 g/10 min at 240 °C and 2.16 kg), M330A (MFR=60 g/10 min at 240 °C and 2.16 kg), M340A (MFR=60 g/10 min at 240 °C and 2.16 kg), M630A (MFR=6 g/10 min at 240 °C and 2.16 kg) and M640A (MFR=6 g/10 min at 240 °C and 2.16 kg) from Hyosung Corporation Co, Ltd. as well as AKROTEK® PK-VM (MFR=60 g/10 min at 240 °C and 2.16 kg), AKROTEK® PK-HM (MFR=6 g/10 min at 240 °C and 2.16 kg) and AKROTEK® PK-XM (MFR=2 g/10 min at 240 °C and 2.16 kg) from AKRO-PLASTIC GmbH.

It is particularly preferred to use such a PK with a melt flow index as mentioned above and the crosslinker in an amount of 0.05 wt. % to 15 wt. %, in particular 0.1 wt. % to 5 wt. %, based on the total amount of PK and crosslinker. In a preferred embodiment, the proportion of crosslinker to be used is 0.1 to 1.5 wt. %, in particular 0.3 to 1.0 wt. %, based on the total amount of PK and crosslinker. With such a ratio and properties of the starting materials, particularly good processability of the products can be achieved. In particular, the stiffness is especially high, characterized by a high modulus of elasticity. Furthermore, such a PK can be processed at a temperature that still allows thermoplastic mixing with the crosslinker without the crosslinking reaction progressing too rapidly during the provision of mixing (=step i)). As a result, a plasticized compound is obtained which can be very easily used in a molding process to produce a molded article (=step ii)). The moldings obtained in this way can then be subjected to a post-curing (=step iii), in which the final material properties are obtained by crosslinking the PK. In other words, in case of using a slower reacting, aromatic crosslinker, the moldings obtained in this way can be subjected to a post-curing (=step iii), in which the final material properties are obtained by crosslinking the PK. In case of a faster reacting, aliphatic crosslinker it may be possible that the moldings obtained in this way are already crosslinked after molding.

According to an embodiment of the invention, the molded article is preferably a molded article based on PK. Here, "based on PK" means that the PK is the essential structure-giving polymer component of the molded article. In one embodiment, it is preferred that the PK is the sole polymer component of the molded article. In a further embodiment, the PK is present in admixture with further polymers, in particular thermoplastic polymers. Preferred further polymers include thermoplastic polyurethanes (TPU) as well as other thermoplastic elastomers, polyesters, liquid crystalline polyesters (LCP), polybutylene terephthalate (PBT), polyethylene terephthalate (PET) and polycarbonate (PC). Preferred mass ratios between PK and the further polymers, in particular thermoplastic further polymers, are thereby 1:1 to 100:1, preferably 5:1 to 100:1, particularly preferably 10:1 to 100:1. Furthermore, the molded article may contain fillers such as fibers and/or usual additives, such as processing aids, and/or functional components. The crosslinked PK forms a matrix in which any additives present are uniformly distributed.

Crosslinker

Preferably, the at least one crosslinker contains at least 80% by weight, in particular at least 90% by weight, more particularly at least 99% by weight, based on the total weight of the crosslinker, of a diamine source selected from the group consisting of

- di(aminophenyl) compounds in which the two aminophenyl rings are linked together by an aliphatic group comprising a carbocyclic radical,
- diamine compounds selected from compounds of formula (I), (II) and (III),
- oligo-/polymers having at least two amide groups,
- saturated alicyclic compounds having at least two primary amine groups, oligo-/polymers containing these incorporated and
- mixtures thereof.

In a preferred embodiment, the at least one crosslinker contains at least 80% by weight, in particular at least 90% by weight, more particularly at least 99% by weight, based on the total weight of the crosslinker, of a diamine source selected from oligo/polymers having at least two amide groups, saturated alicyclic compounds having at least two primary amine groups, oligo/polymers containing them incorporated and mixtures thereof.

The amount of crosslinker is adjusted with respect to the desired degree of crosslinking. Preferably, the amount of crosslinker is 0.05 wt % to 15 wt %, in particular 0.1 wt % to 5 wt %, based on the total amount of aliphatic polyketone and crosslinker. In a preferred embodiment, the amount of crosslinker is 0.1 wt % to 1.5 wt %, especially 0.3 wt % to 1.0 wt %. It has been found that the stability of the product with such a proportion of crosslinker can be particularly advantageous.

In a preferred embodiment, the crosslinker has a boiling point at 1013 mbar which is at least 300 °C, in particular at least 350 °C, in a particular embodiment at least 400 °C. This is advantageous because such crosslinkers have only a relatively low vapor pressure at the required high processing temperatures. Preferably, the boiling point of the crosslinker at 1013 mbar is in a range from 300 °C to 500 °C, in particular in a range from 350 °C to 500 °C. Advantageously, the melting point of the crosslinker is below the melting point of the aliphatic polyketone (PK). This results in good processability and low risk to users.

In a preferred embodiment, the diamine source used as crosslinker is an oligo/polymer having at least two amide groups.

Oligomers are molecules composed of several structurally identical or similar units (monomers). If a larger number of monomers (>50) is present, the term polymer is used.

In the following, the term polyamide is used synonymously with an oligo-/polymer having at least two amide groups.

Insofar as in the following the polyamides are referred to as crosslinkers, this term also includes the products of lower molecular weight formed during the reaction in the process according to embodiments of the invention (e.g., from a hydrolytic cleavage of amide groups with the formation of amine groups capable of reacting with the keto groups of the PK) insofar as these are capable of crosslinking the PK. In this respect, both the polyamides used to provide the mixture of PK and crosslinker and any oligomers containing amine groups and diamine monomers thereof can serve as crosslinkers.

The term polyamides is used in the following to refer to homo- and copolyamides. In the context of embodiments of the invention, polyamides are sometimes designated by standard abbreviations consisting of the letters PA followed by numbers and letters. Some of these abbreviations are defined in DIN EN ISO 1043-1. Polyamides derived from aminocarboxylic acids of the type $H_2N—(CH_2)_z—COOH$ or the corresponding lactams are designated PA Z, where Z denotes the number of carbon atoms in the monomer. For example, PA 6 stands for the polymer derived from ε-caprolactam or the ε-aminocaproic acid. Polyamides derived from diamines and dicarboxylic acids of the types $H_2N—(CH_2)_x—NH_2$ and $HOOC—(CH_2)_y—COOH$ are designated PA xy, where x is the number of carbon atoms in the diamine and y is the number of carbon atoms in the dicarboxylic acid. To designate copolyamides, the components are listed in the order of their quantitative proportions, separated by slashes. For example, PA 66/610 is the copolyamide of hexamethylenediamine, adipic acid and sebacic acid. The following letter abbreviations are used for the monomers with an aromatic or cycloaliphatic group used according to embodiments of the invention: T=terephthalic acid, I=isophthalic acid, MXDA=m-xylylenediamine, IPDA=isophoronediamine, PACM=4,4'-methylenebis(cyclohexylamine), MACM=2,2'-dimethyl-4,4'-methylenebis (cyclohexylamine)

Polyamides can be described by the monomers used to produce them. A polyamide-forming monomer is a monomer suitable for polyamide formation.

In a preferred embodiment, the crosslinker is a polymer having at least two amide groups, the polymer comprising polyamide-forming monomers in copolymerized form selected from the group consisting of A) unsubstituted or substituted aromatic dicarboxylic acids and derivatives of unsubstituted or substituted aromatic dicarboxylic acids,
B) unsubstituted or substituted aromatic diamines,
C) aliphatic or cycloaliphatic dicarboxylic acids,
D) aliphatic or cycloaliphatic diamines,
E) monocarboxylic acids,
F) monoamines,
G) at least trivalent amines,
H) lactams,
I) ω-amino acids, and
K) compounds different from A) to I) and co-condensable therewith, and mixtures thereof.

In a preferred embodiment of the invention, polyamides, preferably with a melting point of 260 °C or less, are used as crosslinkers. In particular, aliphatic polyamides are used. For this purpose, with the proviso that at least one of components A) or B) and at least one of components C) or D) must be present. In a special embodiment, the proviso applies that at least one component A) and at least one component D) must be present.

The aromatic dicarboxylic acids A) are preferably selected from in each case unsubstituted or substituted phthalic acid, terephthalic acid, isophthalic acid, naphthalenedicarboxylic acids or diphenyldicarboxylic acids and the derivatives and mixtures of the previously mentioned aromatic dicarboxylic acids. Substituted aromatic dicarboxylic acids A) preferably have at least one $C_1$-$C_4$-alkyl radical. Particularly preferably, substituted aromatic dicarboxylic acids A) have one or two $C_1$-$C_4$-alkyl radicals. These are preferably selected from methyl, ethyl, n-propyl, isopropyl, n-butyl, iso-butyl, sec-butyl and tert-butyl, particularly preferably methyl, ethyl and n-butyl, very preferably methyl and ethyl and especially methyl. Substituted aromatic dicarboxylic acids A) may also bear further functional groups which do not interfere with amidation, such as 5-sulfoisophthalic acid, its salts and derivatives. Among these, the sodium salt of 5-sulfoisophthalic acid dimethyl ester is preferred. Preferably, the aromatic dicarboxylic acid A) is selected from unsubstituted terephthalic acid, unsubstituted isophthalic acid, unsubstituted naphthalenedicarboxylic acids, 2-chloroterephthalic acid, 2-methylterephthalic acid, 5-methylisophthalic acid and 5-sulfoisophthalic acid. Particularly preferred aromatic dicarboxylic acid A) is terephthalic acid, isophthalic acid or a mixture of terephthalic acid and isophthalic acid.

The aromatic diamines B) are preferably selected from bis-(4-amino-phenyl)methane, 3-methylbenzidine, 2,2-bis-(4-aminophenyl)propane, 1,1-bis-(4-aminophenyl)cyclohexane, 1,2-diaminobenzene, 1,4-diaminobenzene, 1,4-diaminonaphthalene, 1,5-diaminonaphthalene, 1,3-diaminotoluene(e), m-xylylenediamine, N,N'-dimethyl-4,4'-biphenyl-diamine, bis-(4-methyl-aminophenyl)-methane, 2,2-bis-(4-methylaminophenyl)-propane or mixtures thereof. Particularly preferred aromatic diamine is m-xylylenediamine.

The aliphatic or cycloaliphatic dicarboxylic acids C) are preferably selected from oxalic acid, malonic acid, succinic acid, glutaric acid, adipic acid, pimelic acid, succinic acid, azelaic acid, sebacic acid, undecane-1,11-dicarboxylic acid, dodecane-1,12-dicarboxylic acid, maleic acid, fumaric acid or itaconic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, cis- and trans-cyclopentane-1,3-dicarboxylic acid, and mixtures thereof.

The aliphatic or cycloaliphatic diamines D) are preferably selected from ethylenediamine, propylenediamine, tetramethylenediamine, pentamethylenediamine, hexamethylenediamine, heptamethylenediamine, octamethylenediamine, nonamethylenediamine, 2-methyl-1,8-octamethylenediamine, decamethylenediamine, undecamethylenediamine, Dodecamethylenediamine, 2-methylpentamethylenediamine, 2,2,4-trimethylhexamethylenediamine, 2,4,4-trimethylhexamethylenediamine, 5-methylnonamethylenediamine, 2,4-dimethyloctamethylenediamine, 5-methylnonanediamine, bis-(4-aminocyclohexyl)methane, 3,3'-dimethyl-4,4'diaminodicyclohexylmethane, and mixtures thereof.

Particularly preferably, the diamine D) is selected from hexamethylenediamine, 2-methylpentamethylenediamine, octamethylenediamine, nonamethylenediamine, decamethylenediamine, undecamethylenediamine, dodecamethylenediamine, bis(4-aminocyclohexyl)methane, 2,2-bis(4-aminocyclohexyl)propane, 1,3-bis(aminomethyl)cyclohexane and 1,4-bisaminomethylcyclohexane, 5-amino-2,2,4-trimethyl-1-cyclopentanemethylamine, 5-amino-1,3,3-trimethylcyclohexanemethylamine (isophorone diamine), 3,3'-dimethyl-4,4'-diaminodicyclohexylmethane, [3-(aminomethyl)-2-bicyclo[2.2.1]heptanyl]methanamine, aminated dimer fatty acids, and mixtures thereof. In a preferred embodiment of the invention, the aqueous solution contains at least one diamine D) selected from hexamethylenediamine, bis-(4-aminocyclohexyl)methane (PACM), 3,3'-dimethyl-4,4'diaminodicyclohexylmethane (MACM), isophoronediamine (IPDA) and mixtures thereof.

The monocarboxylic acids E) serve for the final capping of the polyamide oligomers used according to an embodiment of the invention. In principle, all monocarboxylic acids capable of reacting with at least some of the available amino groups under the reaction conditions of polyamide condensation are suitable. Suitable monocarboxylic acids E) are aliphatic monocarboxylic acids, alicyclic monocarboxylic acids and aromatic monocarboxylic acids. These include acetic acid, propionic acid, n-, iso- or tert.-butyric acid, valeric acid, trimethyl acetic acid, caproic acid, enanthic acid, caprylic acid, pelargonic acid, capric acid, undecanoic acid, lauric acid, tridecanoic acid, myristic acid, palmitic acid, stearic acid, pivalic acid, cyclohexanecarboxylic acid, benzoic acid, methylbenzoic acids, 1-naphthalenecarboxylic acid, 2-naphthalenecarboxylic acid, phenylacetic acid, oleic acid, ricinoleic acid, linoleic acid, linolenic acid, erucic acid, fatty acids from soybean, linseed, ricinus and sunflower, acrylic acid, methacrylic acid, tertiary saturated monocarboxylic acids (for example Versatic® acids from Royal Dutch Shell plc) and mixtures thereof.

If unsaturated carboxylic acids or their derivatives are used as monocarboxylic acids E), it may be useful to add commercially available polymerization inhibitors to the aqueous solution. Particularly preferably, the monocarboxylic acid E) is selected from acetic acid, propionic acid, benzoic acid and mixtures thereof. In a preferred embodiment, the aqueous solution contains only acetic acid as monocarboxylic acid E). In a preferred embodiment, the aqueous solution contains exclusively propionic acid as monocarboxylic acid E). In a preferred embodiment, the aqueous solution contains exclusively benzoic acid as monocarboxylic acid E).

The monoamines F) are used for the final capping of the polyamide oligomers used according to an embodiment of the invention. In principle, all monoamines capable of reacting with at least some of the available carboxylic acid groups under the reaction conditions of polyamide condensation are suitable. Suitable monoamines F) are aliphatic monoamines, alicyclic monoamines and aromatic monoamines. These include methylamine, ethylamine, propylamine, butylamine, hexylamine, heptylamine, octylamine, decylamine, stearylamine, dimethylamine, diethylamine, dipropylamine, dibutylamine, cyclohexylamine, dicyclohexylamine, aniline, toluidine, diphenylamine, naphthylamine and mixtures thereof.

Suitable at least trivalent amines G) are selected from N'-(6-aminohexyl)hexane-1,6-diamine, N'-(12-aminododecyl)dodecane-1,12-diamine, N'-(6-aminohexyl)dodecane-1,12-diamine, N'-[3-(aminomethyl)-3,5,5-trimethyl-cyclohexyl]hexane-1,6-diamine, N'-[3-(aminomethyl)-3,5,5-trimethyl-cyclohexyl]dodecane-1,12-diamine, N'-[(5-amino-1,3,3-trimethyl-cyclohexyl)methyl]hexane-1,6-diamine, N'-[(5-amino-1,3,3-trimethyl-cyclohexyl)methyl] dodecane-1,12-diamine, 3-[[[3-(aminomethyl)-3,5,5-trimethyl-cyclohexyl]amino]methyl]-3,5,5-trimethyl-cyclohexane amine, 3-[[(5-amino-1,3,3-trimethyl-cyclohexyl)methylamino]methyl]-3,5,5-trimethyl-cyclohexanamine, 3-(aminomethyl)-N-[3-(aminomethyl)-3,5,5-trimethyl-cyclohexyl]-3,5,5-trimethyl-cyclohexanamine. Preferably, at least trivalent amines G) are not used.

Suitable lactams H) are ε-caprolactam, 2-piperidone (δ-valerolatam), 2-pyrrolidone (γ-butyrolactam), capryllactam, enanthlactam, laurylllactam and mixtures thereof.

Suitable ω-amino acids I) are 6-aminocaproic acid, 7-aminoheptanoic acid, 11-aminoundecanoic acid, 12-aminododecanoic acid and mixtures thereof.

Suitable compounds K) which differ from A) to I) and can be cocondensed therewith are at least trivalent carboxylic acids, diaminocarboxylic acids, etc. Suitable compounds K) are furthermore 4-[(Z)—N-(6-aminohexyl)-C-hydroxy-carbonimidoyl]benzoic acid, 3-[(Z)—N-(6-aminohexyl)-C-hydroxy-carbonimidoyl]benzoic acid, (6Z)-6-(6-aminohexylimino)-6-hydroxy-hexanecarboxylic acid, 4-[(Z)—N-[(5-amino-1,3,3-trimethyl-cyclohexyl)methyl]-C-hydroxy-carbonimidoyl]benzoic acid, 3-[(Z)—N-[(5-amino-1,3,3-trimethyl-cyclohexyl)methyl]-C-hydroxy-carbonimidoyl] benzoic acid, 4-[(Z)—N-[3-(aminomethyl)-3,5,5-trimethyl-cyclohexyl]-C-hydroxy-carbonimidoyl]benzoic acid, 3-[(Z)—N-[3-(aminomethyl)-3,5,5-trimethyl-cyclohexyl]-C-hydroxy-carbonimidoyl]benzoic acid, and mixtures thereof.

In a preferred embodiment of the invention, a crosslinker selected from polyamides, copolymers thereof and mixtures thereof is used, wherein the crosslinker has a melting range of 200 °C to 250 °C, preferably a melting range of 220 °C to 240 °C, in particular a melting range of 220 °C to 230 °C.

In another preferred embodiment, the at least one crosslinker is selected from a saturated alicyclic compound having at least two primary amine groups and oligo-/polymers incorporating them. Suitable compounds are those having a boiling point greater than 300 °C. In a preferred embodiment, these compounds are present as a liquid in step i). They can thus serve as internal solvents during melt mixing. Preferably, the saturated alicyclic compound is an aminized fatty acid dimer (dimer fatty acid).

The term "fatty acid dimer" as used herein refers to the dimerized product of the reaction of two or more than two monounsaturated or polyunsaturated fatty acids. Such fatty acid dimers are well known in the prior art and typically exist as mixtures.

Mixtures prepared by oligomerization of unsaturated fatty acids are referred to as aminated dimer fatty acids (also known as aminated dimerized fatty acids or dimer acids). Unsaturated $C_{12}$- to $C_{22}$-fatty acids can be used as starting materials. Depending on the number and position of the double bonds of the $C_{12}$ to $C_{22}$ fatty acids used to prepare the dimer fatty acids, the amine groups of the dimer fatty acids are linked to one another by hydrocarbon radicals which predominantly have 24 to 44 carbon atoms. These hydrocarbon radicals may be unbranched or branched and may have double bonds, $C_6$-cycloaliphatic hydrocarbon radicals or $C_6$-aromatic hydrocarbon radicals, the cycloaliphatic radicals and/or the aromatic radicals may also be present in condensed form. Preferably, the radicals connecting the amine groups of the dimer fatty acids do not have any aromatic hydrocarbon radicals, and very preferably no unsaturated bonds. Dimers of $C_{18}$ fatty acids, i.e., fatty acid dimers with 36 C atoms, are particularly preferred. These are obtainable, for example, by dimerization of oleic acid, linoleic acid and linolenic acid and mixtures thereof. The dimerization is followed, if necessary, by hydrogenation and then amination.

In a particular embodiment, the saturated alicyclic compound is

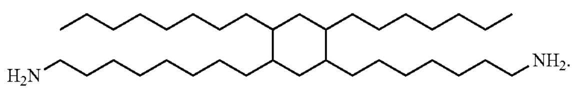 [SMILES: CCCCCCCCC1CC(CCCCCCC)C(CCCCCCCN)CC1CCCCCCCCN]

In another particular embodiment, the saturated alicyclic compound is

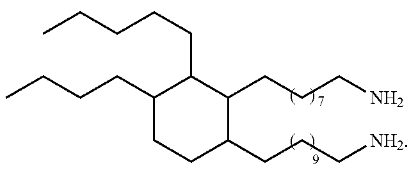

A particular embodiment is polymers that have at least one aminated dimer fatty acid incorporated therein. In an even more particular embodiment, polymers that contain the compound

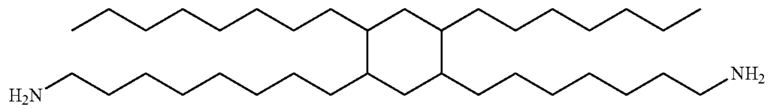 [SMILES: CCCCCCCCC1CC(CCCCCCC)C(CCCCCCCN)CC1CCCCCCCCN]

or

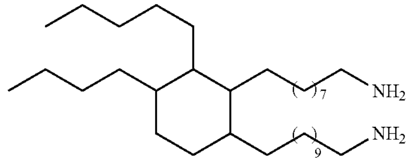

incorporated.

In another preferred embodiment, the at least one crosslinker is a mixture comprising an oligomer/polymer having at least one amide group and a saturated alicyclic compound having at least two primary amine groups.

In another preferred embodiment, the at least one crosslinker is a mixture comprising an oligomer/polymer having at least one amide group and oligomer/polymer comprising at least one saturated alicyclic compound having at least two primary amine groups polymerized therein.

In another preferred embodiment, the at least one crosslinker is a diamine compound selected from compounds of formulae (I), (II) and (III)

(I)

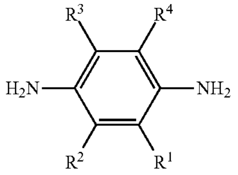

(II)

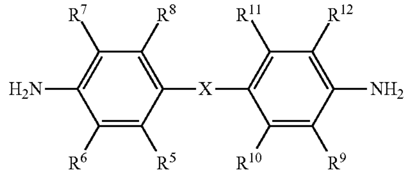

(III)

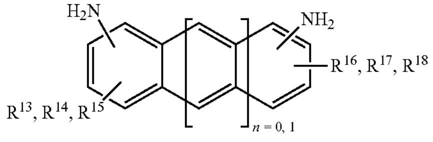

wherein $R^1$, $R^2$, $R^3$ and $R^4$ are independently selected from hydrogen, halogen, nitro, cyano, hydroxy, amino, $C_1$-$C_6$ alkyl, $C_2$-$C_6$ alkenyl, $C_2$-$C_6$ alkynyl, $C_6$-$C_{14}$ aryl, wherein the alkyl group, alkenyl group and alkynyl group are unsubstituted or substituted with $R^a$ and wherein the aryl group is unsubstituted or substituted with $R^b$, $R^5$, $R^6$, $R^7$ $R^8$, $R^9$, $R^{10}$, $R^{11}$ and $R^{12}$ are independently selected from hydrogen, halogen, nitro, cyano, hydroxy, amino, $C_1$-$C_6$ alkyl, $C_2$-$C_6$ alkenyl, $C_2$-$C_6$ alkynyl, $C_6$-$C_{14}$ aryl, wherein the alkyl group, alkenyl group and alkynyl group are unsubstituted or substituted with $R^a$ and wherein the aryl group is unsubstituted or substituted with $R^b$, $R^{13}$, $R^{14}$, $R^{15}$, $R^{16}$, $R^{17}$ and $R^{18}$ are independently selected from hydrogen, halogen, nitro, cyano, hydroxy, amino, $C_1$-$C_6$ alkyl, $C_2$-$C_6$ alkenyl, $C_2$-$C_6$ alkynyl, $C_6$-$C_{14}$ aryl, wherein the alkyl group, alkenyl group and alkynyl group are unsubstituted or substituted with $R^a$ and wherein the aryl group is unsubstituted or substituted with $R^b$, X is selected from a bond, oxygen, sulfur, carbonyl, sulfonyl, sulfoxide, $C_1$-$C_6$ alkylene, $C_2$-$C_6$ alkenylene and phenylene, $R^a$ is selected from halogen, nitro, cyano, hydroxy, carboxyl, amino, $C_6$-$C_{12}$ aryl, wherein the aryl group is unsubstituted or substituted with $R^c$, $R^b$ is selected from halogen, nitro, cyano, amino, $C_1$-$C_4$ alkyl and $C_1$-$C_4$ haloalkyl, $R^c$ is selected from halogen, nitro, cyano, $C_1$-$C_4$ alkyl and $C_1$-$C_4$ haloalkyl.

Examples of $C_1$-$C_4$ alkyl groups are in particular methyl, ethyl, propyl, isopropyl, n-butyl, 2-butyl, sec-butyl and tert-butyl.

Examples of $C_1$-$C_6$ alkyl groups are in particular the previously mentioned $C_1$-$C_4$ alkyl groups as well as n-pentyl, and n-hexyl.

$C_1$-$C_4$ haloalkyl preferably stands for one of the previously mentioned $C_1$-$C_4$ alkyl groups, which preferably has 1, 2, 3, 4 or 5, preferably 1, 2 or 3 halogen substituents. This includes, for example, trifluoromethyl.

Halogen represents fluorine, chlorine, bromine and iodine, preferably fluorine, chlorine and bromine.

Unsubstituted $C_6$-$C_{14}$ aryl preferably represents phenyl, naphthyl, anthracenyl, phenanthrenyl, naphthacenyl, and more preferably phenyl or naphthyl. Substituted $C_6$-$C_{14}$ aryl preferably has 1, 2, 3, 4 or more than 4 radicals, preferably selected from halogen, nitro, cyano, $C_1$-$C_4$ alkyl and $C_1$-$C_4$ haloalkyl. Examples of $C_6$-$C_{14}$ aryl substituted with $C_1$-$C_4$ alkyl are tolyl, xylyl, mesityl.

$C_1$-$C_6$ alkylene is preferably $-CH_2-$, $-CH_2-CH_2-$, $-CH_2-CH_2-CH_2-$, $-CH_2-CH_2-CH_2-CH_2-$ oder $-C(CH_3)_2-$.

In a preferred embodiment, the at least one crosslinker is a compound of formula (I) or (II), wherein $R^2$, $R^3$, $R^5$, $R^6$, $R^7$, $R^8$, $R^{10}$ and $R^{11}$ are hydrogen, $R^1$ and $R^4$ are independently selected from hydrogen, halogen, nitro, cyano, hydroxy, amino, $C_1$-$C_6$ alkyl, $C_2$-$C_6$ alkenyl, $C_2$-$C_6$ alkynyl, $C_6$-$C_{14}$ aryl, wherein the alkyl group, alkenyl group and alkynyl group are unsubstituted or substituted with $R^a$, and wherein the aryl group is unsubstituted or substituted with $R^b$, $R^9$ and $R^{12}$ are independently selected from hydrogen, halogen, nitro, cyano, hydroxy, amino, $C_1$-$C_6$ alkyl, $C_2$-$C_6$ alkenyl, $C_2$-$C_6$ alkynyl, $C_6$-$C_{14}$ aryl, wherein the alkyl group, alkenyl group and alkynyl group are unsubstituted or substituted with $R^a$ and wherein the aryl group is unsubstituted or substituted with $R^b$, X is selected from a bond, oxygen, sulfur, carbonyl, sulfonyl, sulfoxide, $C_1$-$C_6$ alkylene, $C_2$-$C_6$ alkenylene and phenylene, $R^a$ is selected from halogen, nitro, cyano, hydroxy, carboxyl, amino, $C_6$-$C_{12}$ aryl, wherein the aryl group is unsubstituted or substituted with $R^c$, $R^b$ is selected from halogen, nitro, cyano, amino, $C_1$-$C_4$ alkyl and $C_1$-$C_4$ haloalkyl, and $R^c$ is selected from halogen, nitro, cyano, $C_1$-$C_4$ alkyl and $C_1$-$C_4$ haloalkyl.

In a preferred embodiment, the at least one crosslinker is a compound of formula (I.a) or (II.a)

(I.a)

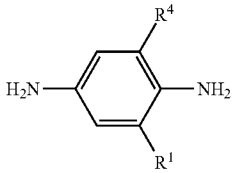

(II.a)

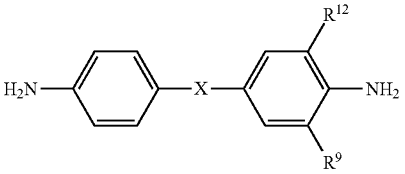

wherein $R^1$, $R^4$, $R^9$ and $R^{12}$ and X have the following meanings

| $R^1$ | $R^4$ |
|---|---|
| Hydrogen | hydrogen |
| Hydrogen | nitro |
| Hydrogen | triflouromethyl |
| Chloro | triflouromethyl |
| Nitro | triflouromethyl |
| Nitro | nitro |
| Chloro | chloro |
| Triflouromethyl | triflouromethyl |
| tert-butyl | tert-butyl |

| X | $R^9$ | $R^{12}$ |
|---|---|---|
| Oxygen | nitro | methyl |
| methylene | methyl | nitro |
| Carbonyl | triflouromethyl | methyl |
| Bond | nitro | methyl |
| Sulfur | hydrogen | methyl |
| Oxygen | trifluormethyl | triflouromethyl |
| Oxygen | fluoro | fluoro |
| Oxygen | cyano | cyano |
| Oxygen | nitro | nitro |
| Carbonyl | triflouromethyl | triflouromethyl |
| Carbonyl | fluoro | fluoro |
| Carbonyl | cyano | cyano |
| Carbonyl | nitro | nitro |

In another preferred embodiment, the crosslinker is selected from compounds of formulae (III.a) and (III.b):

(III.a)

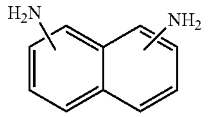

(III.b)

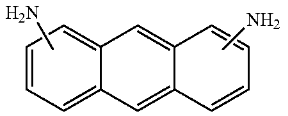

In a particular embodiment, the crosslinker is selected from compounds (III.a1) and (III.b1):

(III.a1)

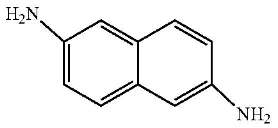

(III.b1)

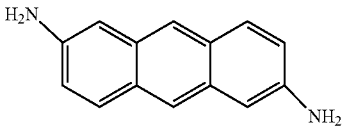

In a further preferred embodiment, the at least one crosslinker is a di(aminophenyl) compound in which the two aminophenyl rings are linked to each other via an aliphatic group comprising a carbocyclic residue.

Di(aminophenyl) compounds used as crosslinkers (or as diamine sources) have two aminophenyl rings linked together. The compounds are therefore primary diamines. Thereby, in an embodiment of the invention, each phenyl ring has only a single amino group. However, it is also conceivable that the phenyl rings independently have two or three amino groups. The compounds are low molecular weight and are not polymers. In addition to the amino groups, the phenyl rings may have further substituents, such as alkyl or halogen groups. The two aminophenyl rings are linked by an aliphatic group. Aliphatic groups consist only of carbon and hydrogen and are not aromatic. The di(aminophenyl) compounds used as crosslinkers (or as diamine sources) preferably have no other double or triple bonds, apart from the two phenyl rings. The aliphatic group has a carbocyclic radical. Carbocyclic radicals are hydrocarbon rings, which may thereby have, for example, 4 to 7 carbon atoms, preferably 5 or 6 carbon atoms. The carbocyclic radical may thereby comprise double bonds of the phenyl rings. Preferably, the carbocyclic group has only a single aliphatic hydrocarbon ring. Preferably, the aliphatic group has a total of 5 to 15 carbon atoms, in particular 6 to 8 carbon atoms. Because of the aliphatic group between the carboycyclic radicals, the two phenyl rings are not conjugated.

According to an embodiment of the invention, it was surprisingly found that PK crosslinked with such di(aminophenyl) compounds exhibits particularly advantageous properties. In particular, the crosslinked PK exhibits improved thermal stability and increased mechanical stability.

In a preferred embodiment, the di(aminophenyl) compound used as the crosslinker (or as the diamine source) is a fused compound in which only one of the two phenyl rings is fused to the carbocyclic radical. Anellation (condensation) refers to the addition of another ring to a ring of a cyclic molecule. The two fused rings share two carbon atoms and thus a C—C double bond of the phenyl ring. The use of such fused-on crosslinkers has the advantage that a particularly rigid and regular bond can be formed between the PK chains, which makes it possible to achieve particularly high temperature stability and rigidity of the products.

The amino groups of the di(aminophenyl) compound used as crosslinker (or as diamine source) can in principle be present at any positions of the phenyl group, i.e. in ortho, meta or para position with respect to the aliphatic linkage of the two phenyl rings. In the embodiment that each phenyl group has only a single amino group, it is preferred that the two amino groups are spaced as far apart as possible. This can be achieved if the two amino groups are attached at the para position with respect to the aliphatic compound and/or at the 4- and 4'-positions of the phenyl rings. In a preferred embodiment, therefore, the diaminodiphenyl compound is a 4,4' diaminodiphenyl compound. In general, the advantage of spacing amino groups as far apart as possible may be to reduce the formation of undesirable intramolecular reactions in which a crosslinker forms two bonds with the same PK polymer chain. Such intramolecular reactions with the crosslinker can disrupt the crystalline structure of the PK without being crosslinking effective, thereby reducing the stability of the product.

In a preferred embodiment of the invention, the di(aminophenyl) compound used as a crosslinker (or as a diamine source) is an asymmetric compound.

In a preferred embodiment of the invention, the di(aminophenyl) compound used as a crosslinker (or as a diamine source) is a compound of the general formula (IV)

(IV)

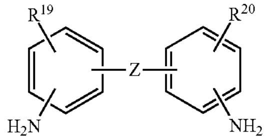

wherein $R^{19}$ and $R^{20}$ are independently selected from H, substituted or unsubstituted alkyl having 1 to 20 C atoms, in particular having 1 to 4 C atoms, in particular methyl or ethyl, substituted or unsubstituted aryl having 5 to 12 C atoms, F and Cl, and wherein Z is the aliphatic group having a carbocyclic radical. In this regard, each phenyl ring may have one, two or three $R^{19}$ or $R^{20}$ radicals independently selected from each other. Preferably, a phenyl ring has only one $R^{19}$ and/or $R^{20}$ radical. Particularly preferably, residues $R^{19}$ and $R^{20}$ are each H. Crosslinkers without additional residues $R^{19}$ and $R^{20}$ are relatively readily available and can be processed to higher-stability crosslinked PK.

Residue Z may be linked to each phenyl radical via two bonds or via one bond. Preferably, residue Z is linked to one phenyl radical via two bonds and to the second phenyl radical via one bond.

In a preferred embodiment of the invention, the crosslinker is a compound of the general formula (IV.a)

(IV.a)

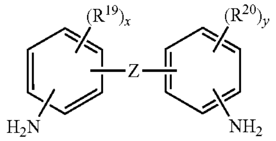

wherein x is 3 or 4 depending on the number of bonds of the phenyl ring substituted with $R^{19}$ to the group Z, y is 3 or 4 depending on the number of bonds of the phenyl ring substituted with $R^{20}$ to the group Z, in each case $R^{19}$ is independently selected from hydrogen, unsubstituted or substituted or alkyl of 1 to 20 carbon atoms, unsubstituted or substituted or aryl of 5 to 14 carbon atoms, F and Cl, $R^{20}$ is in each case independently selected from hydrogen, unsubstituted or substituted or alkyl of 1 to 20 carbon atoms, unsubstituted or substituted or aryl of 5 to 14 carbon atoms, F and Cl, Z is an aliphatic group having a carbocyclic moiety, wherein Z is linked to each of the two phenyl rings through one or through two bonds.

Preferably, Z is bonded to the $R^{19}$ substituted phenyl ring through two bonds. In compounds (IV.a), x is then 3. Preferably, Z is bonded to the phenyl ring substituted with $R^{20}$ through one bond. In the compounds (IV.a), y then stands for 4. Specifically, x stands for 3 and y stands for 4. In particular, Z forms an indane skeleton with the two phenyl rings to which a phenyl ring is bonded.

In the compounds of formulae (IV) and (IV. (a), alkyl with 1 to 20 C atoms preferably comprises the previously given definition for $C_1$-$C_6$ alkyl and additionally n-heptyl, n-octyl, 2-ethylhexyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, arachinyl and their constitutional isomers. Particularly preferred is alkyl with 1 to 4 C atoms, especially methyl or ethyl.

Substituted alkyl with 1 to 20 C atoms has at least 1 (e.g. 1, 2, 3, 4 or more than 4) substituents, preferably selected from halogen, nitro, cyano and $C_1$-$C_4$alkoxy. Substituted alkyl specifically represents $C_1$-$C_4$haloalkyl, which preferably has 1, 2, 3, 4 or 5, preferably 1, 2 or 3 halogen substituents. This includes, for example, trifluoromethyl.

In the compounds of the formulae (IV) and (IV.a), unsubstituted aryl having 5 to 14 C atoms preferably represents phenyl, naphthyl, anthracenyl and phenanthrenyl, in particular phenyl or naphthyl. Unsubstituted aryl with 5 to 12 C atoms stands in particular for phenyl or naphthyl. Substituted aryl having 5 to 14 C atoms or substituted aryl having 5 to 12 C atoms preferably has 1, 2, 3, 4 or more than 4 radicals, preferably selected from halogen, nitro, cyano, $C_1$-$C_4$alkyl and $C_1$-$C_4$haloalkyl. Examples of substituted aryl with 5 to 14 C atoms or substituted aryl with 5 to 12 C atoms are tolyl, xylyl, mesityl.

In the compounds of formula (IV.a), the radicals $R^{19}$ are preferably selected from hydrogen, substituted or unsubstituted alkyl having 1 to 4 C atoms, F and Cl. Particularly preferably, the radicals $R^{19}$ are selected from hydrogen and unsubstituted alkyl having 1 to 4 C atoms.

In the compounds of formula (IV.a), the radicals $R^{20}$ are preferably selected from hydrogen, substituted or unsubstituted alkyl having 1 to 4 carbon atoms, F and Cl. Particularly preferably, the radicals $R^{20}$ are selected from hydrogen and unsubstituted alkyl having 1 to 4 carbon atoms.

Preferably, each phenyl ring has none, one or two radicals $R^{19}$ or $R^{20}$ other than hydrogen. In a particular embodiment, $R^{19}$ and $R^{20}$ are all hydrogen. Compounds of formula (IV.a) in which $R^{19}$ and $R^{20}$ are all hydrogen are relatively readily available and can be processed into more highly stable, crosslinked PK.

In a preferred embodiment, the crosslinker is a compound of the general formula (V):

(V)

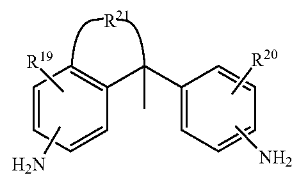

wherein wherein $R^{19}$ and $R^{20}$ are independently selected from H, substituted or unsubstituted alkyl having 1 to 20 C atoms, in particular having 1 to 4 C atoms, in particular methyl or ethyl, substituted or unsubstituted aryl having 5 to 12 C atoms, F and Cl, and where $R^{21}$ is a carbocyclic radical which has 2 to 3 C ring atoms and which may be substituted by at least one alkyl group having 1 to 4 C atoms, in particular methyl or ethyl. Particularly preferably, the radicals $R^{19}$ and $R^{20}$ are each H. The carbocyclic radical $R^{21}$ is thus a pentyl or hexyl radical. Such crosslinkers have the advantage that a particularly good combination of temperature stability and mechanical stability of the crosslinked PK can be obtained.

In a preferred embodiment, the crosslinker is a compound of the general formula (V.a):

(V.a)

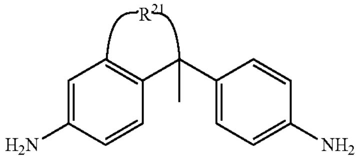

wherein $R^{21}$ is selected as indicated above. Such crosslinkers have the advantage that a particularly good combination of temperature stability and mechanical stability of the crosslinked PK can be obtained.

In a preferred embodiment, the crosslinker has the formula (V.a1):

(V.a1)

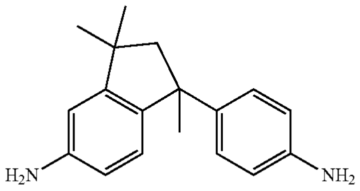

The compound resulted in a particularly advantageous combination of temperature stability and mechanical stability of the crosslinked PK in the experiments conducted. The chemical name is 1-(4-aminophenyl)-1,3,3-trimethyl-indan-5-amine (CAS No. 54628-89-6).

In another preferred embodiment, the crosslinker has the formula (V.b1):

(V.b1)

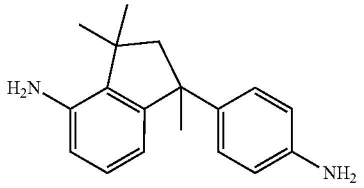

In the tests carried out, the compound also leads to a particularly advantageous combination of temperature stability and mechanical stability of the crosslinked PK. The chemical name is 1-(4-aminophenyl)-1,3,3-trimethyl-indan-6-amine.

In another preferred embodiment, the crosslinker has a mixture of compounds of formula (V.a1) and (V.b1). This crosslinker also leads to a particularly advantageous combination of temperature stability and mechanical stability of the crosslinked PK in the experiments carried out.

In a further preferred embodiment, the crosslinker has the formula (VII):

(VII)

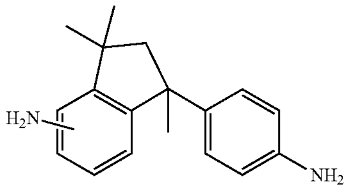

This crosslinker also leads to a particularly advantageous combination of temperature stability and mechanical stability of the crosslinked PC in the tests carried out. The chemical name is 1-(4-aminophenyl)-1,3,3-trimethyl-indan-amine (CAS No. 68170-20-7). Here, the amino group on the aromatic ring of the indane can occur at all positions. Also included are mixtures of 1-(4-aminophenyl)-1,3,3-trimethyl-indan-amines in which the amino group on the aromatic ring of the indane is located at different positions.

According to an embodiment of the invention, it is preferred to use a single concrete crosslinker in order to obtain material properties that are as uniform as possible. However, it is also possible to use mixtures of two or more crosslinkers.

Flame Retardant (A)

According to an embodiment of the invention, the molded article, and the curable polymer composition contain at least one flame retardant (A). The term flame retardant PK means that the PK comprises at least one flame retardant (A). The term flame retardant molded article means that the molded article comprises at least one flame retardant (A). The term flame retardant curable polymer composition means that the polymer composition comprises at least one flame retardant (A).

The flame retardant (A) is selected from organic compounds, inorganic compounds and mixtures thereof.

Inorganic flame retardants A) are preferably selected from compounds of phosphorus, magnesium, calcium, boron, aluminum, antimony, tin, zinc and mixtures thereof. A further suitable but not preferred inorganic flame retardant A) is red phosphorus. Red phosphorus can be chemically modified to stabilize the material in order to avoid to formation of phosphine gas through reaction with moisture.

Special inorganic flame retardants A) are selected from magnesium hydroxide, aluminum hydroxide (also denoted as aluminum trihydrate, ATH), calcium borate, calcium based hydrated minerals, boron, antimony trioxide, tin oxide, zinc borate, zinc stannate, zinc hydroxystannate, molybdenium trioxide, red phosphorus, ammonium polyphosphate and mixtures thereof. Preferably, the flame retardant A) is selected from magnesium hydroxide, calcium borate, calcium based hydrated minerals, boron, antimony trioxide, tin oxide, zinc borate, zinc stannate, zinc hydroxystannate, molybdenium trioxide and mixtures thereof.

Preferred inorganic flame retardants are metal hydroxides. In the event of fire, metal hydroxides exclusively set free of water and therefore do not form toxic or corrosive flue gas products. In addition, these hydroxides are capable of reducing the smoke gas density in the event of fire.

In a preferred embodiment, the flame retardant A) comprises or consists of magnesium hydroxide ($Mg(OH)_2$). In particular, the magnesium hydroxide has a particle size in the range from submicron particle size, preferably in the range of less than 1 micrometer, up to 6 micrometers. Particularly preferred, the particle size is in the range of 1 to 2 micrometers. In particular, the magnesium hydroxide has a high particle surface area, preferably a BET specific surface area in the range of 2 to 35 $m^2/g$, particularly preferred in range of 2 to 10 $m^2/g$. In a special embodiments, the magnesium hydroxide particles are coated with a surface active agent, such as various fatty acids or salts or esters of fatty acids. Particularly preferred surface active agents include calcium stearate and stearic acid.

Organic flame retardants A) are preferably selected from organic phosphorus compounds, organic nitrogen containing compounds, organic halogen compounds and mixtures thereof.

Halogenated organic flame retardants are very efficient, as they show excellent flame retardant properties even in small quantities, and work well in the herein described molded articles. Examples of suitable halogenated organic flame retardants are polybrominated diphentyl ethers (PBDEs), like e.g., DecaBDE, polybrominated biphenyl (PBB), brominated polystyrene, tetrabromobisphenol A (TBBPA), brominated cyclohydrocarbons, like e.g. hexabromocyclododecane (HBCD) or brominated phenol derivates like e.g. tribromophenol. Because many halogenated chemicals are persistent, bioaccumulative, toxic and/or critical to waste disposal they are not generally preferred in an embodiment of the invention although their use can be advantageous in individual cases.

Preferably, the molded article or the curable polymer composition according to an embodiment of the invention contains an organic phosphorus-containing flame retardant. According to an embodiment of the invention, most known phosphorus-containing flame retardants can be used for PKs.

Preferred organic phosphorus compounds are selected from phosphate, polyphosphate, phosphite, phosphinates, phosphonite, phosphoric and phosphonic acid esters, dihydro-oxa-phospho-phenantrene derivatives (DOPOs) and phosphazenes.

Phosphates in the sense of an embodiment of the invention are the salts and esters of orthophosphoric acid ($H_3PO_4$).

Suitable phosphates are selected from melamine phosphates, alkyl phosphates, aryl phosphates, oligomeric phosphates, aliphatic diphosphates, pentaerythritol phosphate, halogen-containing phosphates, ammonium polyphosphate and mixtures thereof.

Melamine phosphates are for example melamine orthophosphate, dimelamine orthophosphate, melamine pyrophosphate or melamine polyphosphate.

Alkyl phosphates are for example dimethyl phosphate, diethyl phosphate, dipropyl trimethyl phosphate, triethyl phosphate, tripropyl phosphate, tris-(2-ethylhexyl) phosphate or pentaerythritol phosphate.

Aryl phosphates are for example triphenyl phosphate, tricresyl phosphate, cresyl diphenyl phosphate and resorcinol and bisphenol A bis(diphenyl) phosphate).

A preferred alkyl aryl phosphate is 2-ethylhexyl diphenyl phosphate.

Oligomeric phosphates are for example oligomeric ethyl ethylene phosphates.

Halogen-containing phosphates are for example tris(2-chloroethyl) phosphate, tris(1-chloro-2-propyl) phosphate (TCPP), tris(1,3-dichloro-2-propyl) phosphate, and tris(tribromo-neopentyl) phosphate.

Phosphonates in the sense of an embodiment of the invention are salts and esters of phosphonic acid (HP(O)$(OH)_2$) as well as of the organic phosphonic acid derived therefrom ($RPO(OH)_2$, wherin R is selected from alkyl or aryl).

Suitable phosphonates are for example dimethyl methyl phosphonate (DMMP), diethyl ethyl phosphonate, diethyl propyl phosphonate and cyclic phosphonates such as Solvay's Amgard CU or spirobis(methyl phosphonate) from THOR GmbH, halogen-containing phosphonates, such as bis(2-chloroethy)-2-chloroethylphosphonate and mixtures thereof.

Phosphinates in the sense of an embodiment of the invention are salts and esters of phosphinic acid ($H_2P(O)(OH)$).

In a preferred embodiment, the flame retardant A) comprises or consists of a phosphinic acid salt of the general formula (P1) and/or (P2) and/or polymers thereof (P1)

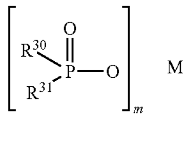

(P2)

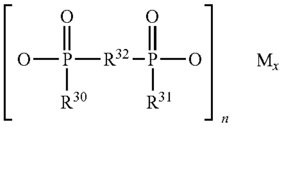

wherein $R^{30}$ and $R^{31}$ are independently selected from straight-chain or branched $C_1$-$C_8$-alkyl and aryl, $R^{32}$ is selected from straight-chain or branched $C_1$-$C_{10}$-alkylene, $C_6$-$C_{10}$-arylene, $C_1$-$C_4$-alkyl-$C_6$-$C_{10}$-arylene and $C_6$-$C_{10}$-aryl-$C_1$-$C_4$-alkylene, M is selected from Mg, Ca, Al, Sb, Sn, Ge, Ti, Zn, Fe, Zr, Ce, Bi, Li, Na, K or a protonated nitrogen base, m is 2 or 3, n is 1 or 3 and x is 1 or 2.

In particular, the flame retardant A) is selected from the calcium, aluminum and zinc salts of dimethylphosphinic acid, ethylmethylphosphinic acid, diethylphosphinic acid, n-propylmethylphosphinic acid, n-propylethylphosphinic acid, di-n-propylphosphinic acid, diisopropylphosphinic acid diphenylphosphinic acid. Suitable commercial products are aluminium diethylphosphinate (DEPAL) and zinc diethyl phosphinate. Aluminium diethylphosphinate, zinc diethyl phosphinate and mixtures thereof are particularly preferred flame retardants A).

Phosphites in the sense of an embodiment of the invention are esters and salts of the phosphorous acid ($P(OH)_3$).

Suitable phosphites are selected from triphenylphosphite, diphenylalkylphosphite, phenyldialkylphosphite, tris(nonylphenyl)phosphite, trilaurylphosphite, trioctadecylphosphite, distearylphentaerythritol diphosphite,tris(2,4-di-tert-butylphenyl)phosphite, diisodecylpentaerythritol diphosphite, bis(2,4-di-tert-butylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, Bis(2,4,6-tris-(tert-butylphenyl)) pentaerythritol diphosphite, tristearyl sorbitol triphosphite, bis(2,4-di-tert-butyl-6-methylphenyl)methylphosphite, bis (2,4-di-tert-butyl-6-methylphenyl)ethylphosphite and mixtures thereof.

Organic polyphosphates in the sense of an embodiment of the invention are salts or esters of polymeric oxyanions formed from tetrahedral $PO_4$ (phosphate) structural units linked together by sharing oxygen atoms. The cations are organic cations. Preferred organic polyphosphates are melamine phosphate, melamine pyrophosphate, melamine polyphosphate, melamine ammonium polyphosphate, melamine ammonium pyrophosphate, dimelamine phosphate and dimelamine pyrophosphate. Those compounds are also mentioned in the following as melamine based flame retardants.

Phosphonites are organophosphorus compounds with the formula $P(OR)_2R$, wherein R is selected from alkyl or aryl.

In a further preferred embodiment, the flame retardant A) comprises or consists of a dihydro-oxa-phospho-phenantrene derivative (DOPO) or derivative thereof. DOPOs and DOPO derivatives suitable as flame retardants are described in US 2012/0095140 A1. DOPO is the abbreviation of 6H-dibenz[c,e][1,2]oxaphosphorin-6 oxide (Cas. no. RN35948-25-5]

The nitrogen-containing flame retardants A) are preferably selected from melamine-based flame retardants, guanidine-based flame-retardants, sterically hindered amine flame retardants, isocyanurate flame retardants, allantoin, benzoguanamine, glycoluril, urea cyanurate and mixtures thereof.

The melamine-based flame retardants A) are preferably selected from melamine, melamine cyanurate, melamine borate, melamine phosphate, melamine pyrophosphate, melamine polyphosphate, melamine ammonium polyphosphate, melamine ammonium pyrophosphate, dimelamine phosphate and dimelamine pyrophosphate, melamine phenylphosphonates, condensation products of melamine and mixtures thereof.

The term "melamine cyanurate" denotes an 1:1 complex of 1,3,5-triazinane-2,4,6-trione-1,3,5-triazine-2,4,6-triamine.

Preferred condensation products of melamine are melam (M1), melem (M2), melon (M3) and mixtures thereof.

(M1)

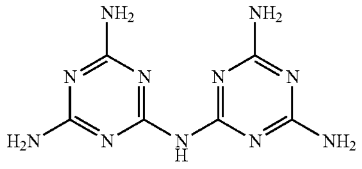

(M2)

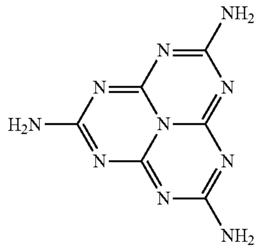

(M3)

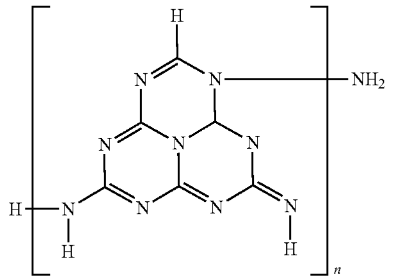

The guanidine-based flame retardants A) are preferably selected from guanidine phenylphosphonates. Guanidine phenylphosphonates and melamine phenylphosphonates are described e.g. US 2012/0108712 A1. Preferred are compounds of the formula (M4) and (M5)

(M4)

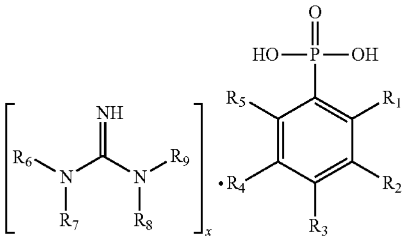

(M5)

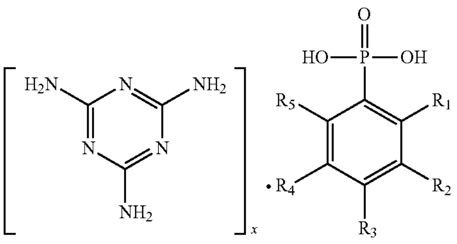

wherein in formulae (M4) and (M5)

$R^1$ to $R^5$ are independently selected from hydrogen, $C_1$-$C_4$-alkyl, hydroxyl, hydroxy-$C_1$-$C_4$-alkyl and $C_1$-$C_4$-alkoxy, x is 1 or 2, and wherein in formula (M4)

$R^6$ to $R^9$ are independently selected from hydrogen, $C_1$-$C_4$-alkyl, phenyl, phenyl-$C_1$-$C_4$-alkyl, where penyl is unsubstituted or substituted by 1, 2 or 3 substituents, independently selected from $C_1$-$C_4$-alkyl and hydroxyl.

Suitable melamine phenyl phosphonate salts are described in U.S. Pat. No. 4,061,605 and suitable guanidine phenyl phosphonate salt are described in U.S. Pat. No. 4,308,197.

Preferred sterically hindered amine flame retardants A) are sterically hindered N-alkoxyamines (NOR HALS), disclosed for example in U.S. Pat. Nos. 5,004,770, 5,204,473, 5,096,950, 5,300,544, 5,112,890, 5,124,378, 5,145,893, 5,216,156, 5,844,026, 6,117,995 and 6,271,377. Flame retardant compositions on the basis of sterically hindered amine flame retardants are described e.g., in WO 2009/080554 A1 and US 2012/0108712 A1.

The isocyanurate flame retardants A) are preferably selected from polyisocyanurate, esters of isocyanuric acid or isocyanurates. Representative examples are hydroxyalkyl isocyanurates, such as tris-(2-hydroxyethyl)isocyanurate, tris(hydroxymethyl)isocyanurate, tris(3-hydroxy-n-proyl) isocyanurate or triglycidyl isocyanurate.

Further suitable nitrogen-containing flame retardants A) are allantoin (=(2,5-dioxo-4-imidazolidinyl)urea), benzoguanamine, glycoluril (=tetrahydroimidazo[4,5-d]imidazole-2,5-dione) and urea cyanurate.

The afore-mentioned flame retardants A) can be employed as the single flame retardant component of the molded articles or in any combination of two or more flame retardants. In the sense of an embodiment of the invention, a combination of two or more (e.g. 3, 4, 5 or more) flame retardants A) is also denoted as a flame retardant composition. The flame retardants contained in a flame retardant composition can all be selected from the same class of flame retardants or can be selected from different classes of flame retardants.

A special embodiment is a flame retardant composition comprising at least one flame retardant A) and at least one synergist. The synergists can be a flame retardant itself. In this case, synergism means that the overall flame retardancy effect is higher than the sum of the single components effects. The synergist can also be at least one component different from the flame retardants A). In this case, the synergist enables to reduce the concentration of the flame retardant A) in the molded article or the curable polymer composition according to an embodiment of the invention and/or has a further beneficial effect on the properties of the end products. The synergist can e.g. act as antidripping-agent, improve the performance e.g. in the UL 94 test, improve the char formation in case of fire, reduce the smoke density, etc.

A preferred embodiment is a flame retardant composition, containing magnesium hydroxide and an inorganic synergist. The inorganic synergist is preferably selected from borates, in particular zinc borate, silicates and nanocomposites based on aluminosilicate clay minerals, in particular montmorillonite.

A further preferred embodiment is a flame retardant composition, containing magnesium hydroxide and a further component, preferably selected from phosphorus-containing flame retardants, $Sb_2O_3$, zinc borate and mixtures thereof.

In a further preferred embodiment, at least one phosphorus-containing flame retardant A) can be combined with at least one synergist, which is different from the phosphorus-containing flame retardants. In a special embodiment, the flame retarded (A) is selected from phosphorus-containing flame retardants selected from phosphates, phosphites, phosphinates, phosphonites, phosphoric and phosphonic acid esters, phosphazenes, and the synergist is selected from melamine.

in particular the phosphorus-containing flame retardants selected from phosphate, phosphite, phosphinates, phosphonite, phosphoric and phosphonic acid esters, phosphazenes.

A further special embodiment is a flame retardant composition A), comprising A1) at least one salt of an alkyl- or aryl-phosphonic acid and A2) at least one nitrogen-containing flame retardant. Preferred is a flame retardant composition A), comprising A1) at least one salt of an alkyl- or aryl-phosphonic acid and A2) at least one melamine or a condensation product thereof.

A further special embodiment is a composition, comprising A) at least one phosphinic salt of the formula (P1) and/or P2) as defined above, e.g., aluminum dimethylphosphinate, alumina methylethylphosphinate, and aluminum methylpropylphosphinate and B) a nitrogen compound, such as allantoin (=(2,5-dioxo-4-imidazolidinyl)urea), benzoguanamine, glycoluril (=tetrahydroimidazo[4,5-d]imidazole-2,5-dione), urea cyanurate, melamine cyanurate and melamine phosphate. Suitable are also synergistic flame retardant combinations comprising comprising A) a phosphinate of formula (II) above, e.g. a diethyl phosphinate where M is calcium, magnesium, aluminum and/or zinc, and B) condensation or reaction products of melamine e.g., melamine polyphosphate, melam polyphosphate and melem polyphosphate.

A further special embodiment is a composition, comprising a zinc compound, selected from zinc stannate ($ZnSnO_3$ and $Zn_2SnO_4$) and zinc hydroxystannate ($ZnSn(OH)_6$) as a synergist. In particular zinc hydroxystannate is an environmentally friendly flame retardant with good smoke suppression properties and also acts as a flame retardant itself.

Preferably the flame retarded (A) is is halogen free.

Preferably, the molded article according to any one of the preceding claims, wherein the molded article comprises the flame retardant (A) as above, in an amount of 5 to 30% by weight, based on the total weight of the polymer matrix, in particular 7 to 15% by weight, based on the total weight of the polymer matrix.

Fillers and Reinforcing Materials and Additives

The curable/hardenable polymer composition as well as the molded part may optionally contain fillers and reinforcing materials and/or additives different therefrom. The cross-linked flame retardant PK forms a matrix in which any fillers and reinforcing materials and/or additives are uniformly distributed.

The term "filler and reinforcing material" is understood broadly in the context of embodiments of the invention and includes particulate fillers, fibrous materials and any transitional forms. Particulate fillers can have a wide range of particle sizes, from dusty to coarse-grained particles. Filler materials can be organic or inorganic fillers and reinforcing materials.

Suitable inorganic reinforcing materials are, for example, ceramic fillers, such as aluminum nitride, silicon nitride and boron, or mineral fillers, such as asbestos, talc, wollastonite, microvite, silicates, basalt, serpentines, chalk, calcined kaolins, mica, vermiculite, illite, smectite, montmorillonite, hectorite, double hydroxides metasilicate, feldspat and quartz powder, amorphous silica, kaolins, calcium carbonate, magnesium carbonate, calcium silicate, silicates, titanium dioxide, zinc oxide, glass particles, nanoscale layered silicates, nanoscale aluminum oxide ($Al_2O_3$), nanoscale titanium dioxide ($TiO_2$), layered silicates and nanoscale silicon dioxide ($SiO_2$) and and mixtures thereof. The fillers can also be surface-treated.

Furthermore, one or more fibrous materials may be used. These are preferably selected from known inorganic reinforcing fibers, such as carbon fibers, boron fibers, glass fibers, silica fibers, ceramic fibers and basalt fibers; organic reinforcing fibers, such as aramid fibers, polyester fibers, nylon fibers and polyethylene fibers; and natural fibers, such as wood fibers, flax fibers, hemp fibers, cellulosic fibers, fluff fibers, kenaf and sisal fibers.

Suitable glass fibers are for example short glass fibers (SGF), long glass fibers (LGF), endless glass fibers, glass fabrics, mats, fleeces, rovings, yarns, cut or milled glass fibers, glass silk rovings and milled glas silk.

Glass fibers having a length of 5 mm or less are typically denoted as short glass fibers and glass fibers having a length of more than 5 mm are typically denoted as long glass fibers.

Suitable glass fiber are conventional glass fibers, such as E, S, C, AR, ECR.

The glass fibres may be substantially cylindrical with a circular cross section, yet other cross sectional shapes, like for example oval or (rounded) square are also suitable. In a preferred embodiment, the glass fibres have a substantially circular cross section. In this case, the thickness is identical with the mean diameter.

The glass fibres used in an embodiment of the present invention typically have a diameter in the range of from 3 to 50 micrometer, preferably from 5 to 30 micrometer.

The single glass filaments are generally bundled into fibers and the fibers may be bundled to yarns, ropes or rovings, or woven into mats. In a special embodiment, the glass fibres originate from glass multifibre strands, also referred to as glass rovings. Glass multifibre strands or rovings preferably contain from 500 to 10000 glass filaments per strand. Examples of suitable rovings are the Advantex products designated for example as SE4220, SE4230 or SE4535 and available from Binani 3B Fibre Glass company, available as 1200 or 2400 tex, or TUFRov 4575, TUFRov 4588 available from PPG Fibre Glass.

In preparing the molding compositions of an embodiment of the present invention, it can be convenient to use filamentous glass in the form of chopped strands.

Preferably, the fillers are short glass fibers that can be added to polymer matrix via an extrusion process, long glass fibers that can added to polymer matrix during extrusion or during injection molding.

Preferably, the fillers and reinforcing material, if present, is used in an amount of up to 80% by weight, in particular from 0.1% to 80% by weight, specifically from 1% to 50% by weight, based on the total weight of the molded article.

Suitable additives are selected from carbon black, antioxidants, extenders, lubricants, light stabilizers (UV stabilizers, UV absorbers or UV blockers) heat stabilizers, slip and release agents, dyes and pigments, catalysts for crosslinking reaction, thickeners, thixotropic agents, surface active agents, viscosity modifiers, nucleating agents, plasticizers, antistatic agents, mold release agents, defoamers, bactericides and mixtures thereof.

Preferably, the additives, if present, is used in an amount of up to 20% by weight, for in particular from 0.1% by weight to 20% by weight, more particularly from 0.1% by weight to 18% by weight, based on the total weight of the molded article.

Process

The process according to an embodiment of the invention relates to a crosslinking reaction in which the polymer chains of the polyketones are covalently and intramolecularly bonded to one another.

Step (i)

In step (i), a mixture containing the polyketone and the crosslinker and the flame retardant is provided. The mixture provided in step (i) can be prepared by conventional compounding methods.

In an embodiment according to the invention the mixture in step (i) can be obtainded by adding individual components, for example the PK, the flame retardant (A) and the crosslinking agent and optionally the filler/reinforcement material and additives into the mixture.

In an embodiment according to the invention the mixture in step (i) can be obtained by adding premixes of one or more components, for example a premix of the PK and the flame retardant (A) is prepared. In a subsequent step the crosslinking agent and optionally the filler/reinforcement material and additives are mixed with the premix.

In an embodiment according to the invention the mixture in step (i) can be obtained by adding premixes of one or more components, for example a premix of the crosslinking agent and the flame retardant (A) is prepared. In a subsequent step the PK and optionally the filler/reinforcement material and additives are mixed with the premix.

In an embodiment according to the invention the mixture in step (i) can be obtained by adding premixes of one or more components, for example a premix of the PK and the flame retardant (A) and a filler/reinforcement material and additives is prepared. In a subsequent step the crosslinking agent is mixed with the premix.

The addition order of the components, PK, crosslinking agent and flame retardant is not critical as long as the flame retardant is added to the mixture obtained in step (i) before the crosslinking reaction of the PK with the crosslinker takes place.

In step (i), preferably a mixture of the at least one polyketone, the at least one flame retardant is provided as a premix. Subsequently, the premix of the flame-retardant and polyketone is blended with the at least one crosslinker and optionally with a filler and reinforcing agent and optionally another additive.

In step (i), preferably the at least one polyketone, the at least one crosslinker, the at least one flame retardant optionally a filler and reinforcing agent and optionally another additive different therefrom are subjected to melt mixing (variant 1) or dry mixing ( ).

In melt mixing (also denote as melt blending) according to variant 1, the polymers are heated above their melting temperature and intensively mixed by rolling, kneading or extruding. In this process, the temperature in step (i) is preferably adjusted so that the mixture is readily processable and has a viscosity suitable for compounding. Furthermore, the temperature in step (i) is preferably adjusted so that no significant reaction between the polyketone and the crosslinker takes place yet. In addition, the residence time should be kept as short as possible at temperatures where a reaction between the PK and the crosslinker is already taking place. In contrast to PAEK, in which the reactivity of the reacting carbonyl groups is reduced by mesomeric effects of the adjacent phenylene groups, the aminic crosslinking of PK with the crosslinker described according to an embodiment of the invention preferably starts already in the melt. According to an embodiment of the invention, it is not necessary that, as in the processes described in the prior art, covalent bonding of the crosslinking agents to the PK via amine bonds already takes place. This is advantageous because, according to an embodiment of the invention, such an additional reaction step can be omitted, which would have to be precisely controlled to prevent an undesired further reaction of the intermediates and a resulting premature crosslinking.

In one embodiment, in step (i) the at least one polyketone, the at least one crosslinker, the at least one flame retardant, optionally a filler and reinforcing material and optionally a further additive different therefrom are fed into an extruder, mixed with plasticization and optionally granulated.

The temperature in step (i) during melt mixing is preferably in the range of 220 to 260 °C.

In a further embodiment (variant 2), in step (i) the at least one polyketone, the at least one crosslinker, the at least one flame retardant, optionally a filler and reinforcing material and optionally another additive different therefrom are subjected to dry mixing. The components mentioned can be mixed with any known dry blend technique. A dry blend of polyketone, the at least one crosslinker, the at least one flame retardant, optionally the filler and reinforcing material and optionally a further additive different thereof is obtained.

The term "dry mixing" (variant 2) in the sense of the application denotes a mixing process at a temperature below the melting point of the polyketone or, if the polymer has more than one melting point, the lowest melting point of the polyketone. However, "dry mixing" encompasses that components are employed in a liquid form (but as mentioned not a polymer melt).

The temperature in step (i) during dry blending is below the softening range of polyketone, preferably in the range of 0 °C to 100 °C.

During the preparation of the mixture, intensive mixing is carried out by suitable means, such as stirring or kneading equipment, in order to achieve uniform distribution of the crosslinker and polymer. This is of high importance in order to obtain uniform material properties with regard to stability. In one embodiment the crosslinker is distributed in the polymer. In another embodiment the crosslinker is distributed on at least of the surface of the polymer. Preferably, the crosslinkable mixture is further processed in step (ii) after preparation without further intermediate steps that change the composition.

During mixing, an intermediate product can be obtained, for example a granulate. These intermediates are stable at temperatures in the range of less than 80 °C, preferably less than 50 °C, especially at ambient temperature and below for a longer period of time and can, for example, be stored temporarily and/or transported to another location and further processed.

In a preferred embodiment of the invention, the mixture does not contain a solvent. Specifically, no external solvent is added to the mixture. In accordance with an embodiment of the invention, it was surprisingly found that mixtures of the polyketone, the crosslinker and the flame retardant as well as the filler or reinforcing material, can be processed without the use of a solvent, with intimate mixing taking place.

Preferably, the mixture is heated to a temperature at which it is in liquid or flowable (plasticized) form. In order to obtain a homogeneous mixture, it is preferred in this case to select the temperature and residence time such that no significant crosslinking occurs in the process.

In a preferred embodiment, to produce a mixture in step (i), the crosslinker is added continuously to the polyketone. In this case, the components can be in liquid or solid form. In this way, a particularly uniform mixture can be obtained. The crosslinker is preferably added with intimate mixing, for example with stirring, kneading, rolling and/or extrusion. In a preferred embodiment, the crosslinker is supplied in the form of a concentrate. This has the advantage that the crosslinker can be metered better, which can improve the uniformity of the mixture. Overall, a particularly homogeneous mixture can be obtained when the crosslinker is added continuously, so that particularly regular crosslinking is achieved. This can prevent the formation of areas of different degrees of crosslinking, which can lead to inhomogeneities and possibly damage to the product under thermal or mechanical stress. In this way, particularly good properties in terms of temperature stability and mechanical stability can be achieved.

Step (ii)

In step (ii), a molded article is produced from the mixture obtained in step (i). Step (ii) of the production of the molded article comprises all measures by which the mixture is formed into a three-dimensional shape which is retained in the cured, crosslinked state. Preferably, the molded article is produced by means of molding processes such as are customary for thermoplastics. In this context, it is preferred that the production of the molded article takes place before crosslinking and/or during crosslinking. In this context, it is generally not critical if the mixture used in step (ii) already contains small amounts of crosslinked products. Particularly preferably, shaping takes place before step (iii) because the mixture can advantageously be thermoplastically processed and shaped before crosslinking, in particular by hot pressing, extrusion, injection molding and/or 3D printing.

If in step (i) the mixing of the components is performed by dry mixing, in step (ii) the dry mixture is melted and subjected to a molding step as described above.

In one embodiment, steps (i) and (ii) proceed separately in sequence.

In a preferred embodiment, the molded article is produced in step (ii) by thermoplastic forming. This means that the compound can be molded from the melt in a state that is not crosslinked and/or at least not significantly crosslinked, since otherwise thermoplastic processing would no longer be possible. If there are too many crosslinking sites, the PK intermediate is no longer flowable and cannot be readily thermoplastically molded. The compound should only be exposed to the high processing temperatures for a short period of time before molding. Therefore, thermoplastic processing is preferably carried out in such a way that the residence time of the mixture in the apparatus is as short as possible. In this context, it is preferred in one embodiment that the processing is carried out in such a way that the substantial part of the crosslinking reaction, and thereby, for example, more than 80%, more than 90% or more than 95% of the crosslinking, takes place only after the shaping, i.e., in step (iii). It is also preferred, in another embodiment, that the crosslinking reaction, and thereby, partly or completely, e.g., preferably more than 80%, more preferable more than 90%, in particular more than 95%, especially 99% of the crosslinking, takes place during the shaping, i.e., in step (ii). This embodiment can in particular preformed if the crosslinker is at least one saturated alicyclic compound or aliphatic compound having at least two primary amine groups and/or oligo-/polymers containing these incorporated. In other words a molded article with crosslinked PK is already obtained in step ii).

In a preferred embodiment, the mixture is processed in step (ii) by extrusion, hot pressing, injection molding and/or 3D printing and is thereby formed. These processes are particularly suitable for easy and efficient processing of thermoplastic polymer compositions. "Forming" means that a shape first imparted is later changed again. Typical forming processes include bending, stamping, stretching, deep drawing, etc.

Extrusion can be carried out according to known processes. During extrusion, solid to viscous hardenable masses are continuously pressed out of a forming orifice (also known as a die, die or mouthpiece) under pressure. This produces bodies with the cross-section of the opening, called extrudate, of theoretically any length. Preferably, the extrusion takes place at a temperature of at least 220 °C, preferably between 220 °C and 265 °C, and in particular between 230 °C and 250 °C.

Hot pressing is a process in which the molding compound is introduced into the previously heated cavity. The cavity is then closed using a pressure piston. The pressure causes the molding compound to acquire the shape specified by the mold. Preferably, hot pressing is carried out at a temperature of at least 220 °C, preferably between 220 °C and 265 °C, and in particular between 230 °C and 250 °C.

Injection molding (often also referred to as injection molding or injection molding process) is a molding process used in plastics processing. In this process, the plastic is plasticized with an injection molding machine and injected under pressure into a mold, the injection molding tool. In the mold, the material returns to its solid state by cooling and is removed as a molded part after the mold is opened. The cavity of the mold determines the shape and surface structure of the product.

In 3D printing, for example, the method known as fused deposition modeling (FDM) can be used to shape the molding compounds of an embodiment of the invention. FDM is fundamentally based on the three elements of print bed (on which the desired object is printed), filament spool (supplies the print material) and print head (also known as extruder). The filament, consisting of the thermoplastic molding compound, is unwound during the process, fed to the extruder, melted there and deposited layer by layer on the printing plate.

Particularly preferably, processing is by extrusion and subsequent injection molding. The mixture of the PK, the crosslinker and the flame retardant is melted in these processes if it is not already in liquid form. In step (ii), the mixture is preferably introduced into an extruder, injection molding machine, or hot press, melted at high temperatures, for example in the range of 220 °C to 250 °C, and formed into a desired shape.

Step (iii)

In the afore-mentioned embodiments, where the molded article with a partly or completely crosslinked polyketone is already obtained in step ii) the heating step iii) can be waived.

Step (iii) comprises thermally treating the molded article at a temperature at which PK is crosslinked, thereby obtaining the crosslinked molded article. This allows the PK to be intermolecularly crosslinked with the crosslinker. The polyamide is hydrolyzed and split into diamine components. During crosslinking, two imine bonds are formed between two keto groups of the PK chains and the two amino groups of the released diamine of the crosslinker. The resulting bridge in the form of an imine is also known as a Schiff base, since the imine nitrogen does not carry a hydrogen atom but is linked to an organic molecule. The crosslinking is as complete as possible, so that as many amino groups of the crosslinker used as possible react with the carbonyl groups of the PK. The advantage of complete crosslinking is increased heat resistance and increased stiffness (modulus). Nevertheless, only partial crosslinking should also be included in the term "crosslinked". Only partial crosslinking may be present when insufficient crosslinker has been used to fully incorporate all of the PK chains into the network. In this case, the material usually has a higher elongation at break than the fully crosslinked material. The imine bonds impart high stability to the molded article. According to an embodiment of the invention, the molded article is preferably a molded article based on PK. Here, "based on PK" means that the PK is the essential structure-giving polymer component of the molded article. In one embodiment, it is preferred that the PK is the only polymer component of the molded article.

The temperature at step (iii) can be set relatively high because the crosslinkers that can be used according to an embodiment of the invention have relatively high melting and boiling points. This is advantageous because such crosslinking reactions are generally favored at high temperature. Preferably, however, the temperature is below the melting range of flame-retardant polyketone and below the softening point of the not yet fully crosslinked molded article.

Surprisingly, it was found that in the system according to an embodiment of the invention, the crosslinking reactions already take place below the melting range of the polymer and the molded article. This was unexpected, since it is generally assumed that crosslinking reactions preferentially take place at temperatures above the melting range of the polymer and the molded article.

It is further assumed in the prior art that such crosslinking reactions occur relatively rapidly within minutes or a few hours. It depends on the chemical structure of the crosslinker as well as the post-crosslinking temperature. Aromatic diamines crosslink the PK base material in range of hours while aliphatic or cycloaliphatic diamines show a much faster crosslinking reaction that is finished within a few minutes. In accordance with an embodiment of the invention, it was found that the crosslinked PK can exhibit particularly advantageous properties if the heating of the molded article in step (iii) is preferably carried out over a period of at least 1 hour, for example from 1 hour to 2 days, depending on the crosslinking temperature. It has been found that thermal stability, modulus of elasticity and tensile strength can be substantially increased by such thermal treatment.

In particular, it was found that thermal treatment can improve the stiffness of the samples at elevated temperatures. It has been observed that thermal treatment for a certain duration can significantly improve stiffness, although saturation may subsequently occur, so that stiffness is not improved or is only marginally improved with further thermal post-treatment. However, further thermal post-treatment usually shows an improvement in heat deflection temperature. It has been found that the heat deflection temperature can also increase with longer thermal post-treatment.

In a preferred embodiment, the molded article obtained in step (ii) is subjected to thermal treatment for a shorter period of time. Preferably, the thermal treatment of the molded article in step (iii) is carried out from at most 6 hours, for example from 5 minutes to 6 hours, more preferably from 0.5 minutes to 5 hours and in particular from 1 hour to 4 hours. Advantageous here is that self-crosslinking reactions of the aliphatic polyketone taking place in parallel can be reduced.

Alternatively, however, it may also be expedient to subject the molded article to thermal treatment in step (iii) for a longer period, preferably of at least 6 h, in particular for more than 2 days. In an embodiment of the invention, the thermal treatment is carried out over a period of 2 to 10, in particular for 2 to 6 days. Preferably, the thermal treatment is carried out in the absence of oxygen.

In a preferred embodiment, the thermal treatment in step (iii) is carried out at a temperature of at least 160 °C, preferably at least 180 °C. Preferably, the temperature in step (iii) is between 160 °C and 240 °C, more preferably between 190 °C and 230 °C and especially between 190 °C and 210 °C. At such temperatures, efficient three-dimensional crosslinking can proceed sufficiently quickly without impairing the thermoplastically produced articles, for example by undesirable deformation of the molded articles.

After crosslinking, the moldings are cooled and can be supplied for use or further processed.

As described above, both the mixture in step (i) and the molded article may contain fillers and reinforcing materials and/or, if appropriate, an additive different therefrom. crosslinked PK forms a matrix in which the flame retardant, any fillers and reinforcing materials and/or additives are uniformly distributed. Such fillers, reinforcing materials and/or additives are defined above.

In particular, the molded article is obtainable by the processes according to the an embodiment of invention, which are described within the scope of the present invention. The molded article preferably exhibits the advantageous properties described in the context of embodiments of the present invention for the flame retardant crosslinked PK. In the context of embodiments of the present invention, the term molded article refers to products made of flame retardant crosslinked PK that have a defined three-dimensional shape. In this context, it is not necessary that the molded body is a defined object, but it can also be, for example, a coating. The molded article may consist of or contain the flame retardant crosslinked PK, for example as a composite material or laminate.

In a preferred embodiment, the molded article according to the invention is post-cured. In a first variant, the molded article according to an embodiment of the invention is post-cured over a period of 5 minutes to 6 hours. In a second variant, the molded article according to an embodiment of the invention is post-cured over a period of more than 6 hours up to several days. Different advantageous properties can be achieved in each case by the different variants.

Preferably, the molded article is post-cured for a period of 5 minutes to 6 hours and exhibits advantageous, improved mechanical properties compared with molded articles made from flame retardant uncrosslinked PK, which are characterized by increased tensile modulus, increased yield stress and increased elongation at yield. Preferably, the molded article according to an embodiment of the invention post-cured over a period of 5 minutes to 6 hours has a tensile modulus of at least 1800 MPa, in particular of at least 1900 MPa, and particularly preferably of at least 2000 MPa. Preferably, the molded article postannealed over a period of 5 minutes to 6 hours according to an embodiment of the invention has a yield strength of at least 65 MPa, in particular of at least 68 MPa, and particularly preferably of at least 70 MPa. Preferably, the molded article according to an embodiment of the invention postannealed over a period of 5 minutes to 6 hours exhibits an improved elongation at yield of at least 20%, and particularly preferably of at least 23%.

Preferably, the molded article is post-cured for a period of more than 6 hours to several days and exhibits advantageous, increased stiffnesses compared to molded articles made of flame retardant uncrosslinked PK, which are characterized by a high tensile modulus and increased tensile strength. However, if the crosslinking is too strong, the elongation at yield is significantly reduced. Preferably, the molded article post-cured over a period of more than 6 hours to several days has a tensile modulus of at least 2000 MPa, in particular of at least 2250 MPa and particularly preferably of at least 2500 MPa. In particular, the tensile modulus is between 2000 MPa and 3000 MPa or between 2250 MPa and 3000 MPa. The tensile modulus of uncrosslinked PC, on the other hand, is between 1400 and 1800 MPa. The tensile modulus is determined according to DIN EN ISO527-2.

It may be desirable not to fully crosslink the PK in the molded part, since the elongation at break of the material may decrease with increasing crosslinking. The degree of crosslinking is therefore preferably set with regard to the desired application, for example via the proportion of crosslinking agent and the type and duration of thermal treatment.

The degree of crosslinking is preferably not measured directly, but rather it is determined by suitable test methods, such as a high-temperature tensile test, whether the molded article has the desired properties. At very high temperatures, the dynamic modulus can be determined.

The moldings can be used in particular in technical areas where high mechanical stability, and in particular high rigidity, are required. They are particularly suitable for applications in the automotive, marine, aerospace, rail vehicle, industrial machines and robotics, oil and gas, food and packaging, electrical, energy as well as healthcare, safety and medical industries, and in particular as sealing articles preferably sealing and O-rings, bushings, films, powders, coatings, fibers, bearings, back-up rings, valves, thrust washers, coupling elements, snap hooks, pipes or conduits, cooling tubes, cables, sheaths, sleeves and jackets, covers, heat shields, housings, electronic housings, battery housings, or as a component thereof. They are particularly suitable for applications where high flame resistance, chemical resistance and resistance to abrasion are required. This applies in particular to applications in oil and gas production, aerospace engineering and the chemical industry, and in the process the manufacture of safety-relevant parts, and the energy production sector and the automotive industry. Other conceivable applications are connectors and insulators in the electronics sector, since the crosslinking leads to good insulation properties.

The processes, moldings and sealing articles according to embodiments of the invention solve the problem underlying conventional solutions. They exhibit improved temperature resistance and higher mechanical stability in conjunction with good processability compared with the uncrosslinked PK. In particular, the molded articles exhibit high stiffness, especially above the glass transition temperature. The high stiffness is accompanied by reduced creep behavior at high temperatures. The improved temperature resistance is evident at both the maximum temperature and the continuous service temperature. In this context, the products exhibit very good chemical resistance and reduced flammability, since the material does not melt due to cros slinking and no burning material drips off.

In addition, the molded products of an embodiment of the invention can be produced in a simple and efficient manner by thermoplastic molding processes. For example, they can be produced by simple extrusion. Moreover, the processes are environmentally friendly and can be carried out without endangering users, since the crosslinkers used have relatively high boiling points and are not very volatile.

Embodiments of the invention will be explained with reference to the following examples, but without being limited to the specifically described embodiments.

EXAMPLES

Abbreviations

DAPI: 1-(4-aminophenyl)-1,3,3-trimethyl-indane-6-amine and isomers thereof.
T: Temperature
G': storage modulus
G": loss modules
PA: polyamide
FIG. 1: Comparative example, rheometer curve of a PK/PA-dryblend.
The PK/PA-dryblend has been prepared analogous to example 1, wherein instead of DAPI 1 wt % of PA (PA12, VESTAMID® LX9008) has been used. The dryblend does not cros slink in the injection molding and does not do so even after extended post-heating.
FIG. 2: Example according to an embodiment of the invention, rheometer curve of a PK/aromatic crosslinker dryblend. The PK/aromatic crosslinker dryblend has been prepared analogous to example 1, wherein 1 wt % DAPI has been used. The blend requires a post-heating process, since crosslinking only starts during injection molding.
FIG. 3: Example according to an embodiment of the invention, rheometer curve PK/aliphatic crosslinker dryblend. The PK/aliphatic crosslinker dryblend has been prepared analogous to example 2, wherein 1 wt % Priamine 1075 has been used. Loss modulus and storage modulus have already crossed at the beginning of the rheological measurement.
Conclusion: The crosslinking of PA with PK takes place very slowly, if at all, compared to the monomeric, aromatic or monomeric, aliphatic crosslinkers.

Example 1

0.6 wt.-% DAPI isomer mixture with CAS number 68170-20-7 (crosslinker with formula VII) is mixed into 99.4 wt.-% of the commercial flame retardant and reinforced aliphatic PK compound RIAMAXX HR GF orange K 2-103 (commercially available from RIA-Polymers GmbH, Germany) with a melting point of about 220 °C and a melt volume rate of 30 $cm^3$/10 min (according to ISO 1133/230 °C/10 kg) by means of a twin-screw extruder and the polymer strand is chopped into granules.

The granules were injection moulded into test plates of the dimensions 80 mm×80 mm×2 mm and 80 mm×80 mm×1 mm. Afterwards the plates are subjected to a thermal post-curing for a period of two hours in a vacuum oven.

In the UL94 V flame test the material results a V0 at 0.75 mm.

In a flame test setup where a propane/oxygen flame is directly targeting the plate surface with the oxidizing flame zone (temperature: 1200 °C) the material is not burning and doesn't melt over a test period of 10 minutes.

Example 2

0.6 wt.-% of the diamine crosslinker Priamine 1075 (aminated saturated alicyclic fatty acid dimer, commercially available from Cargill) is dosed into 99.4 wt.-% of the commercial flame retardant and reinforced aliphatic PK compound RIAMAXX® HR GF orange K 2-103 with a melting point of about 220 °C and a melt volume rate of 30 $cm^3$/10 min (according to ISO 1133/230 °C/10 kg) by means of a twin-screw extruder and the polymer strand is chopped into granules.

The granules were injection moulded into test plates of the dimensions 80 mm×80 mm×2 mm and 80 mm×80 mm×1 mm. Rheological examinations showed that the Priamine 1075 already crosslinks with PK base material during injection molding and therefore needs no post-curing step iii).

In the UL94 V flame test the material results a V0 at 0.75 mm.

In a flame test setup where a propane/oxygen flame is directly targeting the plate surface with the oxidizing flame zone (temperature: 1200 °C) the material is not burning and doesn't melt over a test period of 10 minutes.

Example 3

0.36 wt.-% of the diamine crosslinker Priamine 1075 (aminated saturated alicyclic fatty acid dimer, commercially available from Cargill) is dosed onto 99.64 wt.-% of the commercial flame retardant and reinforced aliphatic PK compound RIAMAXX® HR GF orange K 2-103 with a melting point of about 220 °C and a melt volume rate of 30 $cm^3$/10 min (according to ISO 1133/230 °C/10 kg) by using a Mixaco-Mixer typeLAB CM 6-12.

The mixture was then injection moulded into test plates of the dimensions 80 mm×80 mm×2 mm and 80 mm×80 mm×1 mm. Rheological examinations showed that the Priamine 1075 already crosslinks with PK base material during injection molding and therefore needs no post-curing step iii).

In the UL94 V flame test the material results a V0 at 0.75 mm.

In a flame test setup where a propane/oxygen flame is directly targeting the plate surface with the oxidizing flame zone (temperature: 1200 °C) the material is not burning and doesn't melt over a test period of 10 minutes.

Example 4

0.36 wt.-% of the diamine crosslinker Priamine 1075 (aminated saturated alicyclic fatty acid dimer, commercially available from Cargill) is dosed onto 99.64 wt.-% of the commercial flame retardant and reinforced aliphatic PK compound RIAMAXX® HR GF orange K 2-103 with a melting point of about 220 °C and a melt volume rate of 30 $cm^3$/10 min (according to ISO 1133/230 °C/10 kg) by using a MCliquid liquid dosing system from Movacolor. The mixture is then directly fed into an injection moulding machine and test plates of the dimensions 80 mm×80 mm×2 mm and 80 mm×80 mm×1 mm are molded. Rheological examinations showed that the Priamine 1075 already crosslinks with PK base material during injection molding and therefore needs no post-curing step iii).

In the UL94 V flame test the material results a V0 at 0.75 mm.

In a flame test setup where a propane/oxygen flame is directly targeting the plate surface with the oxidizing flame zone (temperature: 1200 °C) the material is not burning and doesn't melt over a test period of 10 minutes.

While subject matter of the present disclosure has been illustrated and described in detail in the drawings and foregoing description, such illustration and description are to be considered illustrative or exemplary and not restrictive.

Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A molded article comprising:

a polymer matrix of crosslinking an aliphatic polyketone with at least one diamine source as a crosslinking agent to form imine groups and wherein the diamine source is selected from the group consisting of:

di(aminophenyl) compounds in which the two aminophenyl rings are linked to each other through an aliphatic group having a carbocyclic residue, diamine compounds selected from compounds of formula (I), (II) and (III), (I)

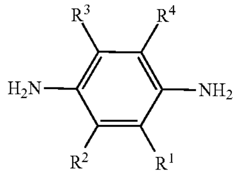

(II)

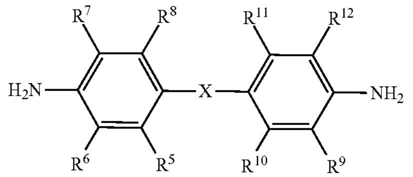

(III)

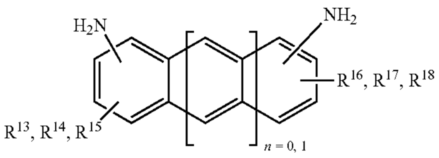

wherein:

$R^1$, $R^2$, $R^3$ and $R^4$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, and $C_6$-$C_{14}$ aryl, wherein the alkyl group, alkenyl group and alkynyl group are unsubstituted or substituted with $R^a$ and wherein the aryl group is unsubstituted or substituted with $R^b$, $R^5$, $R^6$, $R^7$ $R^8$, $R^9$, $R^{10}$, $R^{11}$ and $R^{12}$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, and $C_6$-$C_{14}$ aryl, wherein the alkyl group, alkenyl group and alkynyl group are unsubstituted or substituted with $R^a$ and wherein the aryl group is unsubstituted or substituted with $R^b$, $R^{13}$, $R^{14}$, $R^{15}$, $R^{16}$, $R^{17}$ and $R^{18}$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, and $C_6$-$C_{14}$ aryl, wherein the alkyl group, alkenyl group and alkynyl group are unsubstituted or substituted with $R^a$ and wherein the aryl group is unsubstituted or substituted with $R^b$, X is selected from a bond, oxygen, sulfur, carbonyl, sulfonyl, sulfoxide, $C_1$-$C_6$ alkylene, $C_2$-$C_6$ alkenylene and phenylene, $R^a$ is selected from halogen, nitro, cyano, hydroxy, carboxyl, amino, and $C_6$-$C_{12}$ aryl, wherein the aryl group is unsubstituted or substituted with $R^c$, $R^b$ is selected from halogen, nitro, cyano, amino, $C_1$-$C_4$ alkyl and $C_1$-$C_4$ haloalkyl, $R^c$ is selected from halogen, nitro, cyano, $C_1$-$C_4$ alkyl and $C_1$-$C_4$ haloalkyl, saturated alicyclic compounds having at least two primary amine groups, and mixtures thereof; and at least one flame retardant (A).

2. The molded article according to claim 1, wherein the at least one flame retardant (A) is selected from inorganic compounds of phosphorus, magnesium, calcium, boron, aluminum, antimony, tin, zinc, organic phosphorus compounds, red phosphorus, organic nitrogen-containing compounds, organic halogen compounds and mixtures thereof.

3. The molded article according to claim 1, wherein the at least one flame retardant (A) is selected from $Mg(OH)_2$, phosphates, polyphosphates, phosphites, phosphinates, phosphonites, phosphoric and phosphonic acid esters, phosphazenes and mixtures thereof.

4. The molded article according to claim 1, wherein the molded article comprises the at least one flame retardant (A), in an amount of 5 to 30% by weight, based on the total weight of the polymer matrix.

5. The molded article according to claim 1, comprising at least one filler and reinforcing material and/or an additive different thereof.

6. The molded article according to claim 1, wherein the crosslinker is a di(aminophenyl) compound in which two aminophenyl rings are linked to each other via an aliphatic group having a carbocyclic moiety, and wherein one of the two phenyl rings is fused to the carbocyclic moiety.

7. The molded article according to claim 1, wherein the crosslinker is a saturated alicyclic compound having at least two primary amino groups selected from aminated dimer fatty acids, and the compound

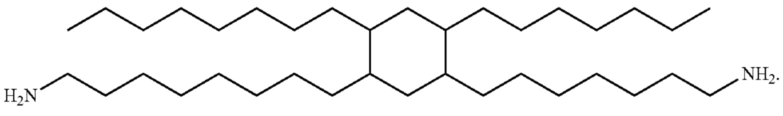

8. A process for preparation of a molded article, comprising:

i) providing a mixture comprising at least one aliphatic polyketone, at least one crosslinker and at least one flame retardant;

ii) preparing the molded article from the mixture provided in step i), and/or iii) post-curing the molded article at a temperature at which the aliphatic polyketone is crosslinked, wherein the at least one crosslinker is selected from:

di(aminophenyl) compounds in which the two aminophenyl rings are linked to each other through an aliphatic group having a carbocyclic residue, diamine compounds selected from compounds of formula (I), (II) and (III), (I)

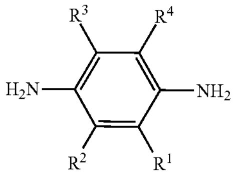

(II)

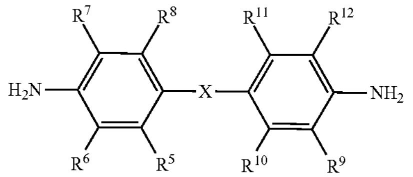

(III)

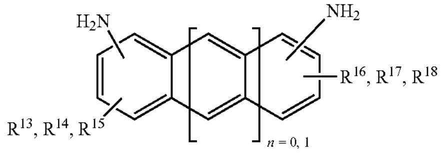

wherein:

$R^1$, $R^2$, $R^3$ and $R^4$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, and $C_6$-$C_{14}$ aryl, wherein the alkyl group, alkenyl group and alkynyl group are unsubstituted or substituted with $R^a$ and wherein the aryl group is unsubstituted or substituted with $R^b$, $R^5$, $R^6$, $R^7$ $R^8$, $R^9$, $R^{10}$, $R^{11}$ and $R^{12}$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, and $C_6$-$C_{14}$ aryl, wherein the alkyl group, alkenyl group and alkynyl group are unsubstituted or substituted with $R^a$ and wherein the aryl group is unsubstituted or substituted with $R^b$, $R^{13}$, $R^{14}$, $R^{15}$, $R^{16}$, $R^{17}$ and $R^{18}$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, and $C_6$-$C_{14}$ aryl, wherein the alkyl group, alkenyl group and alkynyl group are unsubstituted or substituted with $R^a$ and wherein the aryl group is unsubstituted or substituted with $R^b$, X is selected from a bond, oxygen, sulfur, carbonyl, sulfonyl, sulfoxide, $C_1$-$C_6$ alkylene, $C_2$-$C_6$ alkenylene and phenylene, $R^a$ is selected from halogen, nitro, cyano, hydroxy, carboxyl, amino, and $C_6$-$C_{12}$ aryl, wherein the aryl group is unsubstituted or substituted with $R^c$, $R^b$ is selected from halogen, nitro, cyano, amino, $C_1$-$C_4$ alkyl and $C_1$-$C_4$ haloalkyl, $R^c$ is selected from halogen, nitro, cyano, $C_1$-$C_4$ alkyl and $C_1$-$C_4$ haloalkyl, saturated alicyclic compounds having at least two primary amine groups, and mixtures thereof.

9. The process according to claim 8, wherein in step i) the at least one aliphatic polyketone, the at least one crosslinker and the at least one flame retardant are subjected to melt mixing or dry mixing/blending.

10. The process according to claim 9, wherein in step i) the at least one aliphatic polyketone, the at least one crosslinker and the at least one flame retardant are fed into an extruder, mixed with plasticization and the mixture in step i) contains no added solvent.

11. The process according to claim 9, wherein in step i) the at least one aliphatic polyketone, the at least one crosslinker and the at least one flame retardant are dry mixed and the mixture in step i) contains no added solvent.

12. The process according to claim 8, wherein the aliphatic polyketone has a melt viscosity at 240 °C in a range from 2 $cm^3$/10 min to 200 $cm^3$/10 min, measured according to DIN ISO 1130.

13. The process according to claim 8, wherein the temperature in step iii) is at least 220 °C.

14. The process according to claim 8, wherein the mixture in step iii) is processed by extrusion, hot pressing, injection molding and/or 3D printing.

15. A hardenable polymer composition comprising at least one polyketone, at least one flame retardant and at least one crosslinker selected from the group consisting of di(aminophenyl) compounds in which the two aminophenyl rings are linked to each other through an aliphatic group having a carbocyclic residue, diamine compounds selected from compounds of formula (I), (II) and (III), (I)

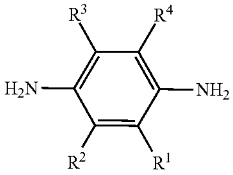

-continued (II)

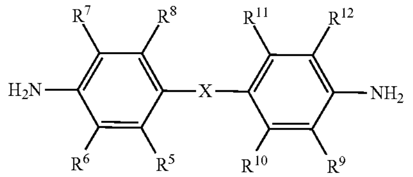

(III)

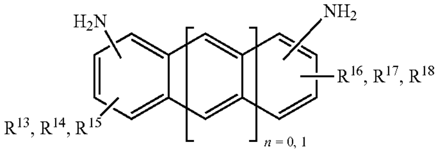

wherein $R^1$, $R^2$, $R^3$ and $R^4$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, and $C_6$-$C_{14}$ aryl, wherein the alkyl group, alkenyl group and alkynyl group are unsubstituted or substituted with $R^a$ and wherein the aryl group is unsubstituted or substituted with $R^b$, $R^5$, $R^6$, $R^7$ $R^8$, $R^9$, $R^{10}$, $R^{11}$ and $R^{12}$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, and $C_6$-$C_{14}$ aryl, wherein the alkyl group, alkenyl group and alkynyl group are unsubstituted or substituted with $R^a$ and wherein the aryl group is unsubstituted or substituted with $R^b$, $R^{13}$, $R^{14}$, $R^{15}$, $R^{16}$, $R^{17}$ and $R^{18}$ are independently from each other selected from hydrogen, halogen, nitro, cyano, hydroxy, amino, $C_1$-$C_6$ alkyl, $C_2$-$C_6$ alkenyl, $C_2$-$C_6$ alkynyl, and $C_6$-$C_{14}$ aryl, wherein the alkyl group, alkenyl group and alkynyl group are unsubstituted or substituted with $R^a$ and wherein the aryl group is unsubstituted or substituted with $R^b$, X is selected from a bond, oxygen, sulfur, carbonyl, sulfonyl, sulfoxide, $C_1$-$C_6$ alkylene, $C_2$-$C_6$ alkenylene and phenylene, $R^a$ is selected from halogen, nitro, cyano, hydroxy, carboxyl, amino, and $C_6$-$C_{12}$ aryl, wherein the aryl group is unsubstituted or substituted with $R^c$, $R^b$ is selected from halogen, nitro, cyano, amino, $C_1$-$C_4$ alkyl and $C_1$-$C_4$ haloalkyl, $R^c$ is selected from halogen, nitro, cyano, $C_1$-$C_4$ alkyl and $C_1$-$C_4$ haloalkyl, saturated alicyclic compounds having at least two primary amine groups, and mixtures thereof.

16. The molded article according to claim 1, wherein the molded article is configured for arrangement in one or more of an automobile, a marine vehicle, an aircraft, a spacecraft, a rail vehicle, an industrial machine, a robot, an oil extraction and/or processing facility, and electronics production facility, a computer, an office machine, a radio, a television set, a food and/or beverage facility, a safety technology, packaging, a medical device, and/or a medical facility.

17. The molded article according to claim 1, wherein the molded article is configured as part of one or more sealing articles, thrust washers, back-up rings, valves, connectors, insulators, snap hooks, bearings, bushings, films, powders, coatings, fibers, sealing and O-rings, pipes and wires, cooling tubes, cables, sheaths, sleeves and jackets, housings of an electrical or chemical application, or battery housings.

18. The molded article according to claim 1, wherein at least one flame retardant (A) comprises or consists of a phosphinic acid salt of the general formula (P1) and/or (P2) and/or polymers thereof (P1)

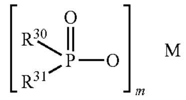

(P2)

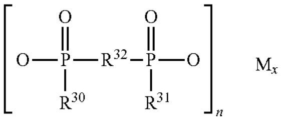

wherein $R^{30}$ and $R^{31}$ are independently selected from straight-chain or branched $C_1$-$C_8$-alkyl and aryl, $R^{32}$ is selected from straight-chain or branched $C_1$-$C_{10}$-alkylene, $C_6$-$C_{10}$-arylene, $C_1$-$C_4$-alkyl-$C_6$-$C_{10}$-arylene and $C_6$-$C_{10}$-aryl-$C_1$-$C_4$-alkylene, M is selected from Mg, Ca, Al, Sb, Sn, Ge, Ti, Zn, Fe, Zr, Ce, Bi, Li, Na, K or a protonated nitrogen base, m is 2 or 3, n is 1 or 3 and x is 1 or 2.

19. The molded article according to claim 18, wherein the at least one flame retardant (A) selected from aluminium diethylphosphinate, zinc diethyl phosphinate and mixtures thereof.

20. The molded article according to claim 1, comprises in addition at least one filling and reinforcing agent.

* * * * *